(12) United States Patent
Xu et al.

(10) Patent No.: US 10,454,830 B2
(45) Date of Patent: Oct. 22, 2019

(54) SYSTEM AND METHOD FOR LOAD BALANCING IN A DATA NETWORK

(71) Applicant: City University of Hong Kong, Kowloon (HK)

(72) Inventors: Hong Xu, Hung Hom (HK); Peng Wang, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 350 days.

(21) Appl. No.: 15/147,073

(22) Filed: May 5, 2016

(65) Prior Publication Data
US 2017/0324664 A1    Nov. 9, 2017

(51) Int. Cl.
| | |
|---|---|
| *H04L 12/803* | (2013.01) |
| *H04L 12/46* | (2006.01) |
| *H04L 12/709* | (2013.01) |
| *H04L 12/801* | (2013.01) |
| *H04L 29/06* | (2006.01) |

(52) U.S. Cl.
CPC ........ *H04L 47/125* (2013.01); *H04L 12/4633* (2013.01); *H04L 45/245* (2013.01); *H04L 47/11* (2013.01); *H04L 47/122* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 8,811,183 B1* | 8/2014 | Anand | H04L 49/25 370/237 |
| 9,036,481 B1* | 5/2015 | White | H04L 47/18 370/235 |
| 9,154,457 B1* | 10/2015 | Li | H04L 61/103 |
| 2010/0306408 A1* | 12/2010 | Greenberg | H04L 12/4633 709/238 |
| 2012/0243403 A1* | 9/2012 | Hu | H04L 61/103 370/217 |
| 2013/0198355 A1* | 8/2013 | Kalyanaraman | H04L 67/34 709/223 |
| 2015/0127797 A1* | 5/2015 | Attar | H04L 47/125 709/223 |

* cited by examiner

*Primary Examiner* — Mohammad S Adhami
(74) *Attorney, Agent, or Firm* — Renner Kenner Greive Bobak Taylor & Weber

(57) ABSTRACT

A method for load balancing in a data network including a plurality of network switches includes receiving a data flow, initiating a path selection process to determine a path between a source network switch and a destination network switch, the path selection process selecting an optimal path based on congestion information of the first network switch and the congestion information of the second network switch, the optimal path corresponding to a path of minimal congestion, and transmitting the data flow along the selected path.

28 Claims, 21 Drawing Sheets

| Flow ID | egress port | PSS | valid |
|---------|-------------|-----|-------|
| 0xF0A3  | 1           | 1   | 1     |
| 0x9EB2  | 4           | 1   | 0     |
| ...     | ...         | ... | ...   |

Fig.6

| Element | Time (ns/pkt) |
|---|---|
| HashRoute | 275 |
| EXPRoute | 473 |
| DRE | 151 |

Fig.12

| Scheme | Avg Time (us) |
|---|---|
| ECMP | 623.90 |
| Expeditus | 638.33 |

Fig.13

SYSTEM AND METHOD FOR LOAD BALANCING IN A DATA NETWORK

TECHNICAL FIELD

The present disclosure relates to a system and method for load balancing in a data network, and particularly, although not exclusively, the present disclosure is relates to a system and method for congestion aware load balancing for multi-tier data networks.

BACKGROUND

Data networks, specifically data center networks, are commonly used in today's world with the advent and proliferation of internet use. Data centers generally comprise a plurality of servers arranged in a network, known as server farms. Data centers with server farms are essential to the functioning of information handling systems in different applications and sectors in the modern economy.

Data center networks commonly come in various structures or architectures. Data center networks are commonly set up in multi-tier architectures such as two tier, three tier, four tier arrangements. Three tier and four tier arrangements are very commonly used. Data center networks, in particular, the nodes or servers in the network are arranged in various topologies. Data integrity and data processing speed are essential requirements for today's applications. Therefore it is becoming increasingly necessary to be able to detect data congestion in the data center network and select data paths or information paths through the network to increase the speed of processing a request.

SUMMARY OF THE INVENTION

In accordance with a first aspect of the present invention, there is provided a method for load balancing in a data network comprising a plurality of network switches, the method comprising:
  receiving a data flow,
  initiating a path selection process to determine a path between a source network switch and a destination network switch,
  the path selection process selecting an optimal path based on congestion information of the first network switch and the congestion information of the second network switch, the optimal path corresponding to a path of minimal congestion, and,
  transmitting the data flow along the selected path.

In an embodiment each path between a source switch and a destination switch comprises;
  at least a first hop, a last hop and one or more intermediate hops, wherein each hop is a portion of the path between the source switch and destination switch,
  the path selection process is a two stage path selection process, a first stage of the two stage path selection process identifying the first and final hops of the path via which to transmit the data flow to the destination switch,
  the second stage of the two stage selection process identifying one or more intermediate hops of the path via which to transmit the data flow to the destination switch.

In an embodiment the first stage of the two stage path selection process identifies an aggregation switch ID, the first stage of the two stage path selection process identifying a first hop that corresponds to the path between a source ToR switch and a source aggregation switch in a first pod, and further identifying a second hop that corresponds to a path between a destination ToR switch and a destination aggregation switch in a second pod.

In an embodiment the source aggregation switch and destination aggregation switch being associated with each other via a pairwise connectivity property, the pairwise connectivity property being such that the source aggregation switch and the destination aggregation switch having the same switch ID and being associated with each other.

In an embodiment the first hop and final hop of the path connecting to one or more aggregation switches having the same switch ID.

In an embodiment the first hop being associated with one or more uplinks of the source ToR switch and the final hop being associated with one or more uplinks of the destination ToR switch.

In an embodiment the second stage of the two stage path selection process identifies a second hop and third hop of the path, the second hop being associated with uplinks of a source aggregation switch and the third hop being associated with the uplinks of the destination aggregation switch.

In an embodiment the second stage of the two stage path selection process identifies a hop between the source aggregation switch and a core switch, and wherein the second stage of the two stage path selection process identifies a hop between the destination aggregation switch and the core switch.

In an embodiment the source aggregation switch and the destination aggregation switch connecting to the same core switch.

In an embodiment the congestion information of the first network switch and the congestion information is determined by applying a congestion monitoring process at each switch within the network to determine the congestion information of all uplinks associated with the network switch in an egress or ingress direction.

In an embodiment the congestion information of the first network switch is the congestion information of all uplinks to the first switch in the egress direction, and the congestion information of the second network switch is the congestion information for all uplinks to the second network switch in the ingress direction.

In an embodiment the congestion information is the local congestion information associated with the uplinks of a network switch.

In an embodiment the congestion monitoring process comprises determining the local congestion information for one or more network switches in both the ingress and egress directions.

In an embodiment the congestion monitoring process further comprises, at each ToR switch, updating the local congestion information in the ingress direction based on the number of packets or bytes entering the ToR switch, and updating the local congestion information in the egress direction based on the number of packets or bytes exiting the ToR switch.

In an embodiment the method comprises the additional step of encapsulating the first packet of each data flow with a dedicated header, the header comprising at least the congestion information associated with all uplinks of at least one network switch, the dedicated header being generated by a source network switch.

In an embodiment the method comprises the additional steps of;

transmitting the packet with the dedicated header to a destination network switch, the destination network switch processing the dedicated header to extract the congestion information, the destination network switch processing the congestion information to identify an intermediate network switch that corresponds to least congestion.

In an embodiment the method comprises the additional steps of:

encapsulating the first packet of each new data flow with a dedicated header, the source ToR switch encapsulating the first packet with the dedicated header to create a request packet, and transmitting the request packet and dedicated header to a destination ToR switch.

In an embodiment the method comprises the additional steps of:

receiving the request packet by the destination ToR switch, processing the request packet to determine a maximum level of congestion of the first and final hops of each path, selecting an aggregation switch ID that corresponds to the least congestion in the first and final hops, and generating a response packet and transmitting the response packet to an aggregation switch matching the aggregation switch ID.

In an embodiment the request packet comprises a first tag identifying to identify the packet as a path selection request packet, a second tag identifying a stage of the path selection process, a third tag identifying the number of congestion metrics and a congestion data field comprising the congestion information associated with all the uplinks in the egress direction of the source ToR switch.

In an embodiment the step of generating the response packet comprises the additional steps of:

copying the request packet, swapping the source and destination IP addresses, setting the second tag in the dedicated header to identify a second stage of path selection, clearing the third tag and clearing the congestion data.

In an embodiment the step of selecting an aggregation switch ID being performed by the destination ToR switch, the step of selecting an aggregation switch ID comprising the additional steps of:

extracting the congestion information associated with the uplinks in the egress direction of the source ToR switch, aggregating the congestion information associated with the uplinks in the egress direction with the congestion information associated with the uplinks in the ingress direction of the destination ToR switch, and selecting an aggregation switch ID that corresponds to the least congestion information.

In an embodiment the congestion information associated with the uplinks in the ingress direction is related to the aggregation switches connected to the destination ToR in the ingress direction.

In an embodiment the second stage of the two stage path selection process identifies a second hop that corresponds to a path between a source aggregation switch and a core switch, and identifies a third hop that corresponds to a path between a destination aggregation switch and the core switch, wherein the source aggregation switch and destination aggregation switch being in communication with the same core switch.

In an embodiment the method comprises the additional steps of determining the core switch that corresponds to the minimum congestion information associated with the source aggregation switch and the destination aggregation switch.

In an embodiment the method further comprises the additional steps of:

receiving a packet with a dedicated header with blank congestion data at the destination aggregation switch, adding congestion information associated with the destination aggregation switch into the congestion data field of the dedicated header, the congestion information associated with the destination aggregation switch being congestion information corresponding to the level of congestion of all uplinks in the ingress direction of the destination aggregation switch, and transmitting the packet to a source aggregation switch that corresponds to a switch ID of the destination aggregation switch.

In an embodiment the method comprises the additional steps of:

receiving a packet with the dedicated header at the source aggregation switch, comparing the congestion information associated with the destination aggregation switch with the congestion information associated with the source aggregation switch, wherein the congestion information associated with the source aggregation switch being congestion information corresponding to the level of congestion of all uplinks in the egress direction of the source aggregation switch, and identifying a core switch the corresponds to the least congestion from the congestion information associated with the destination aggregation switch and the congestion information associated with the source aggregation switch.

In an embodiment the method comprises the additional steps of;

receiving a packet with a dedicated header, by a source ToR switch, wherein the second tag of the header indicating a second stage of the two stage path selection process, updating a path selection table based on the ID of the aggregation switch the packet was transmitted from to the source ToR switch.

In an embodiment a path selection table is utilized to record path selection decisions made by one or more network switches, the path selection table being maintained in each ToR switch, the path selection table maintaining an ID of a network switch corresponding to the selected path.

In an embodiment the data network is a three tier network comprising a core tier, an aggregation tier and a host tier, the core tier comprising a plurality of core switches, the aggregation tier comprising a plurality of aggregation switches and the host tier comprising a plurality of ToR switches, wherein each ToR switch is connected to a plurality of hosts, the aggregation switches and ToR switches being arranged in pods, the network being arranged in a Clos topology.

In accordance with a second aspect of the present invention there is provided a system for load balancing in a network, the system comprising;

comprising a plurality of network switches arranged in a multi tier network topology, each network switch comprising a processor and a memory, and wherein each of the network switches configured to perform a method for load balancing data flows within the network in accordance to any one or more of the embodiments of the first aspect.

In accordance with a third aspect of the present invention there is provided a system for load balancing data flows in a network, the system comprising;

a data network, the network comprising a three tier Clos topology, the network further comprising a core tier, an aggregation tier and a host tier, the core tier comprising a plurality of core switches, the aggregation tier comprising a plurality of aggregation switches and the host tier comprising a plurality of ToR switches, wherein each ToR switch is connected to a plurality of hosts, the aggregation switches and ToR switches being arranged in pods, wherein the plurality of ToR switches, plurality of aggregation switches and plurality of core switches is configured to implement a method of load balancing as per any one of the embodiments of the first aspect, and;

wherein the method of load balancing being implemented as a distributed protocol.

In accordance with a fourth aspect of the present invention there is provided a non-transitory computer readable medium comprising stored instructions that, when executed by one or more processors, causes the one or more processors to perform a method for load balancing within a data network as per any one of the embodiments of the first aspect.

While the invention has been described with reference to a number of preferred embodiments it should be appreciated that the invention can be embodied in many other forms.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, substance or method may have other elements, substances or steps in various embodiments of the invention. The purpose of the claims is to define the features which make up the invention and not necessarily all features which a working embodiment of the apparatus, substance or method, to which the invention defines, may have. The apparatus, substance or method defined in the claims may therefore include other elements, steps or substances as well as the inventive elements, steps or substances which make up the invention and which are specifically recited in the claims.

BRIEF DESCRIPTION OF THE DRAWINGS

Embodiments of the present invention will now be described, by way of example, with reference to the accompanying drawings in which:

FIG. 6 illustrates an example of a path selection table that is used as part of the method for load balancing and the two stage path selection process.

FIG. 12 illustrates a table that of experimental results, the table shows average CPU time of forwarding a packet through each element at the source ToR switch sending at line rate.

FIG. 13 shows a table of average time it takes for the sender to start sending the first packet, the table illustrating a latency comparison over 100 runs.

DETAILED DESCRIPTION OF THE PREFERRED EMBODIMENT

Figure 1A:
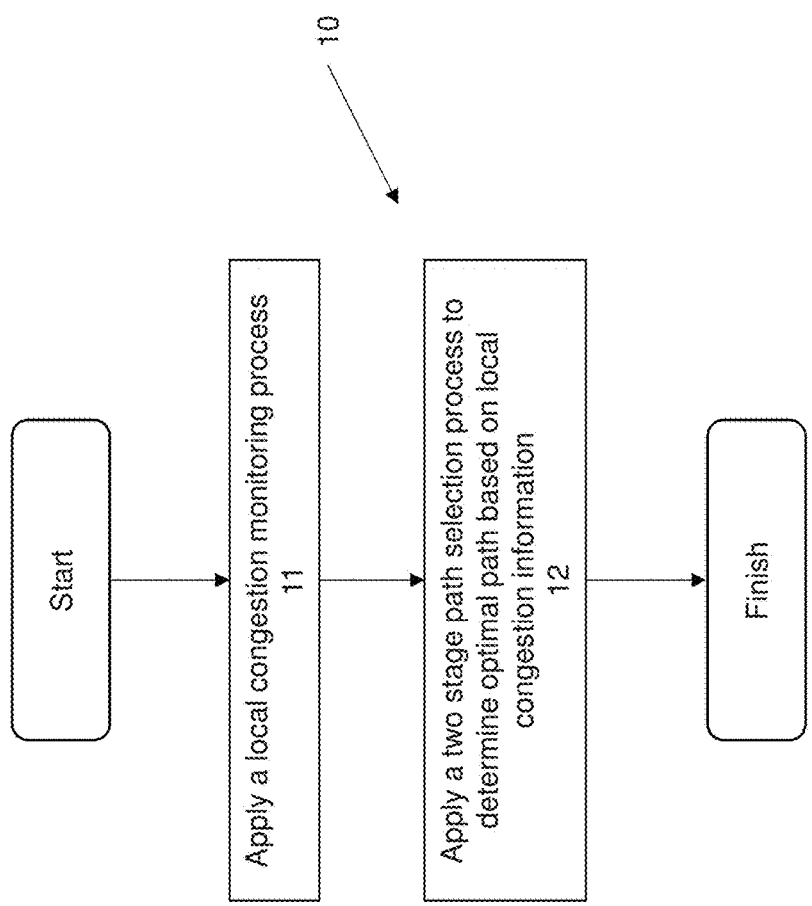
FIG. 1a shows an embodiment of a flow diagram illustrating a method for load balancing data traffic in a network in accordance with the present invention.

Without being bound by theory, the inventors herein through their research, tests and experiments discovered that data center networks may use multi-rooted topologies to provide a large number of equal cost paths and abundant bandwidth between hosts. Some data center networks also use multi-tier topologies. Modern data center networks can also use other topologies and ideally a highly modular topology is chosen to allow the data center network to be easily modified in response to increasing resource demand. A highly modular scalable network topology is needed to provide flexibility to scale the capacity of the network in any dimension. For example additional server pods or additional numbers of servers or additional core switches may be added or subtracted from the network to address different aspects such as increased performance.

Optimal path selection within a network i.e. intra-network optimal path selection is necessary to ensure speed of data processing and efficiency of data processing. Data flows are routed to the appropriate servers for processing or data flows are routed to servers with additional capacity. It is necessary to monitor congestion in the network to select the optimal path to ensure processing speed and data integrity is maintained. One main challenge of congestion monitoring and optimal path selection in complex network structures is to select the optimal path based on acquired global congestion and path data. This is because the number of paths to monitor dramatically increases by two orders of magnitude. In addition the information collected must reflect the real time status of each path, however keeping the information up to date becomes an even greater challenge when the number of paths. These challenges can hinder the scalability of data networks especially multi-tier networks such as Clos network structures or Fat Tree network structures.

Equal cost multi-path routing (ECMP) is the most commonly used load balancing solution implemented in practice. ECMP is known to often deliver poor performance causing low throughput and bandwidth utilization for elephant flows (i.e. large sized data flows) and long tail latency for mice flows (i.e. small sized data flows). In addition, ECMP does not properly handle asymmetry in network topology which often occurs in large scale networks due to failures of one or more network components. These problems are commonly attributed to the heavily-tailed nature of the data flow size distribution. The ECMP protocol or method is congestion agnostic in nature. Hence this protocol and the use of the ECMP protocol limits the ability for the ECMP protocol to address network dynamics. This can be evident when trying to address and improve heavy tail data flow performance. The congestion levels on the equal cost paths in a network and dynamic and change, making ECMP ineffective as the ECMP protocol is congestion un-aware. For example, in a symmetric topology some paths may become temporarily congested due to hash collisions. Failure induced topology asymmetry can arise any time in any part of the network and cause some paths to be persistently more congested. The present invention goes some way to address some of the issues described or at least provide the public with a useful alternative.

The present disclosure relates to a system and method for data balancing in a data network, and particularly, although not exclusively, the present disclosure is relates to a system and method for congestion aware load balancing for multi-tier structured data networks. In particular the present invention is directed to a method and system for congestion aware load balancing in a three tier network. Load balancing comprises determining an optimal path for a data flow based on the congestion data of paths. The present invention further comprises a non transitory computer readable medium comprising stored instructions that, when executed by one or more processors, causes the one or more processors to perform a method for load balancing within a computer network. The processors as described are processors that are incorporated in the switches such as the ToR switches, aggregation switches and the core switches, of a 3 tier network. The present method of load balancing is a routing protocol that is implemented as a distributed protocol with all functionalities being implemented by the hardware components of the network.

FIG. 1a shows a generalized method of load balancing 10. The method of load balancing 10 is implemented as a distributed protocol in a multi-tier network and performed by the various network components such as network switches, i.e. ToR switches, aggregation switches, core switches and the like.

The method of load balancing 10 comprises applying a two stage path selection process to determine a least congested or optimal path through the network for a data flow. The method of load balancing comprises applying a local congestion monitoring process at step 11 to determine the local congestion information for a switch that receives a data flow, applying a two stage path selection process at step 12 to determine an optimal path between two switches based on an aggregated local congestion information for the two switches. The method of load balancing 10 is heuristically determines an optimal path. The path selection method being applied to multiple data flows ensures load balancing within the network and ensures that congested paths are avoided. The method of load balancing 10 and in particular the two stage path selection process 12 is performed on a per flow basis and limited to a path determination between two switches rather than tracking global congestion information and determining a path based on the global congestion information. The method of load balancing 10 is advantageous because it is a simpler method, requires reduced resources to implement, requires reduced cost for implementation, is scalable and is applicable to large networks and asymmetrical networks.

The present invention will be described with respect to three tier networks as three tier networks are commonly used in modern data centers. There are several topologies that may be used such as Clos topologies, Fat tree topologies or D Cell topologies. Clos topologies are commonly used in data centers because they are highly scalable and cost effective.

Figure 1B:
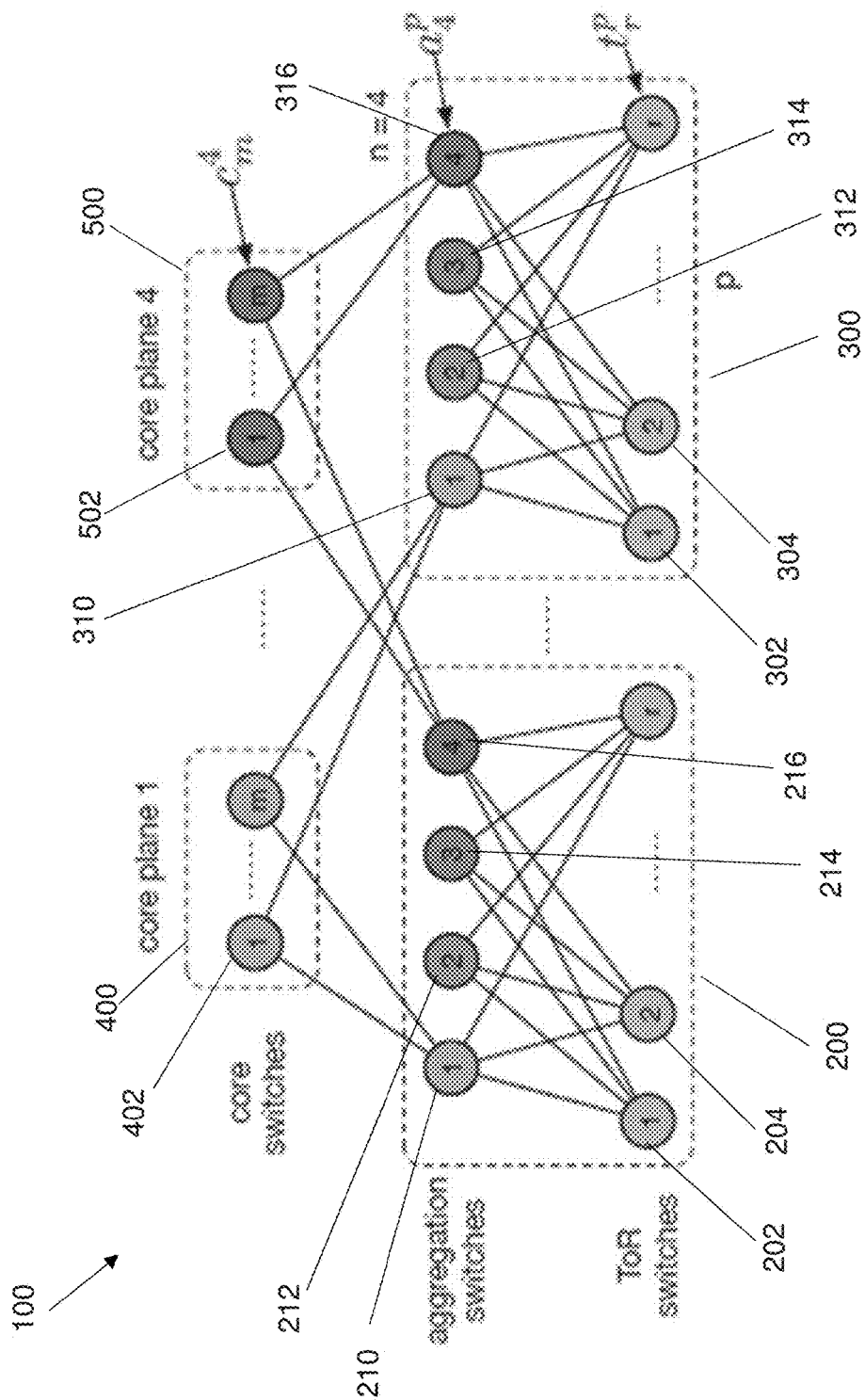
FIG. 1b shows an embodiment of a 3 tier Clos network that is configured to implement a method for load balancing in accordance with the present invention.

FIG. 1b shows a generalized 3 tier network having a Clos topology. The network 100 is arranged in a Clos topology (which will be referred to as a Clos network for ease of explanation herein). The Clos network 100 comprises a plurality of pods. FIG. 1 shows the Clos network 100 comprises two pods 200, 300. It should be understood that industrial networks in data centers comprise a plurality of pods.

Each pod 200, 300 comprises a plurality of ToR (top of rack) switches and a plurality of aggregation switches. The ToR switches connect to server racks that comprise a plurality of servers. The server racks are not illustrated for ease of explanation. As shown in FIG. 1 the pod 200 comprises a plurality of ToR switches 202, 204 up to r. Pod 300 comprises a plurality of ToR switches 302, 304 up to r. In general each Pod comprises r number of ToR switches. Each pod 200, 300 comprises a plurality of aggregation switches, wherein each ToR switches connects to each aggregation switch within the pod. As shown in FIG. 1, pod 200 comprises four aggregation switches 210, 212, 214, 216. Pod 300 also comprises four aggregation switches 310, 312, 314, 316, as shown in FIG. 1. ToR switches 202, 204 . . . r are interconnected to each aggregation switch in pod 200. ToR switches 302, 304 . . . r are interconnected to each aggregation switch in pod 300. The aggregation switches in each pod form an aggregation layer or aggregation tier. Each pod 200, 300 is arranged in a 2-tier leaf spine network or arrangement.

The network 100 comprises a plurality of core planes. FIG. 1b illustrates two core planes 400, 500. In the figure core planes are also referred to as core plane 1 and core plane 4. Each core plane 400, 500 comprises a plurality of core switches. As shown in FIG. 1, core plane 400 comprises core switches 402 up to core switch m. Core plane 500 comprises core switches 502 up to core switch m. Generally the core switches will be referred to as m since there can be any number of core switches depending on the requirements of the network.

An aggregation switch belongs to or is associated with a unique core plane and connects to all the core switches with the associated core plane. For example the aggregation switches 210, 212, 214, 216 of pod 200 are associated with core plane 400, and interconnect to all the core switches in core plane 400.

For ease of explanation and to describe a generalized network the following syntax will be used: t for ToR switches, a for aggregation switches, c for core switches, superscript to denote the pod/plane number and subscript to denote the particular switch ID. Each switch in the network includes a unique switch ID to allow various network components to identify the switch. For example $t_r^p$ is the rth ToR switch in pod p, $a_4^p$ is the 4$^{th}$ aggregation switch in pod p, and $c_m^4$ denotes the mth core switch in plane 4.

The 3 tier Clos topology of network 100, as shown in FIG. 1, provides flexibility to scale capacity in any dimension. For example when more computing capacity is required, additional pods can be added to increase the number of servers. If more inter-pod network capacity is required, additional core switches can be added onto all core planes.

The ToR switches 202, 204, 302, 304 typically will have 4×40 Gbps uplinks. Each pod generally comprises 4 aggregation switches but in alternative embodiments each pod may comprise more or less aggregation switches depending on network requirements and topology. The aggregation and core switches described herein typically have up to 96×40 Gbps ports. Thus for example, if the network 100 comprised 96 pods, the topology could accommodate 73,728 10 Gbps hosts.

The ToR switches, aggregation switches and core switches each comprise an embedded processor and at least some type of memory along with other switching and interfacing circuitry. The ToR switches, aggregation switches, and core switches may further comprise processing capabilities. The ToR switches, aggregation switches and core switches also comprise appropriate input/output circuitry or components as well as communications modules to allow electronic communication with other intra-network elements.

The core switches 402, 502, m comprise input/output components or circuits and communications circuitry that allow the core switches to connect to and communicate with the internet and client devices such as PCs, laptops etc. Data from client devices or requests from client devices is received at the core switches and can be transmitted through the network to the appropriate server via aggregation switches and ToR switches in the network.

Figure 1C:
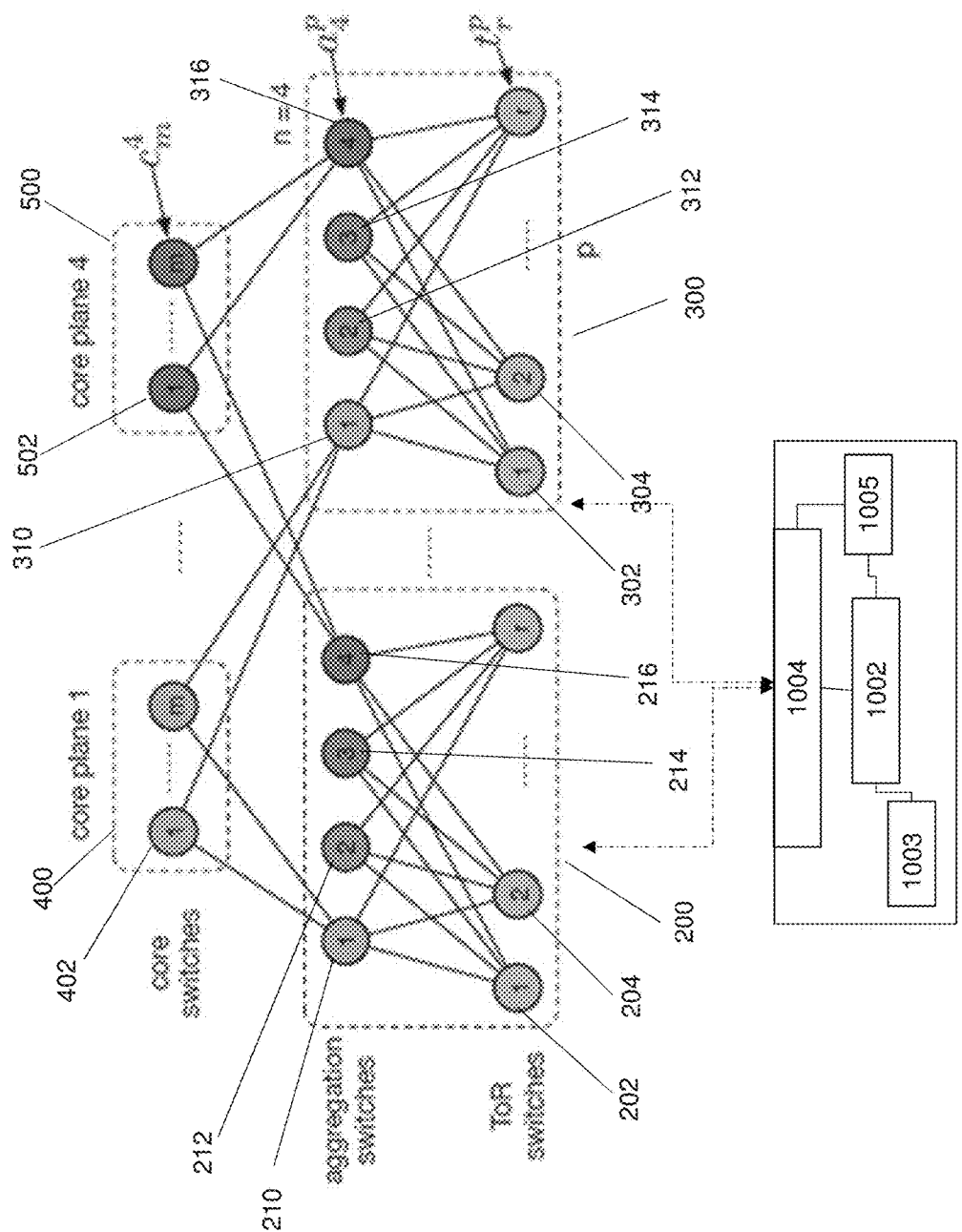
FIG. 1c shows an alternative embodiment of a 3 tier Clos network further comprising a control server that is configured to implement a method of load balancing data traffic in a network.

Optionally in an alternative embodiment the network 100 may further comprise all the features described with respect to FIG. 1b and an additional control server 1000, as shown in FIG. 1c. The control server is configured to be in communication with each pod and core plane. The control server 1000 is configured to be in electronic communication with each of at least the ToR switches, aggregation switches and core switches. The control server 1000 comprises a processor 1002, a memory 1003 such as RAM or ROM or EPROM, an I/O module 1004 and a communications module 1005. In this alternative embodiment the control server 1000 is configured to control the operation of the switches in the network 100. In particular the control server 1000 controls the operation of the switches using the method of load balancing 10 as described herein. In this alternative embodiment the memory 1003 is a non-transitory computer readable medium that includes instructions stored within it. The instructions are executable by the processor 1002 to cause the processor to perform the steps of the method of load balancing as described herein. The processor 1002 is in communication with the network switches, as represented by the two dashed lines, and can communicate with any pair of switches as part of the load balancing method.

Figure 2:
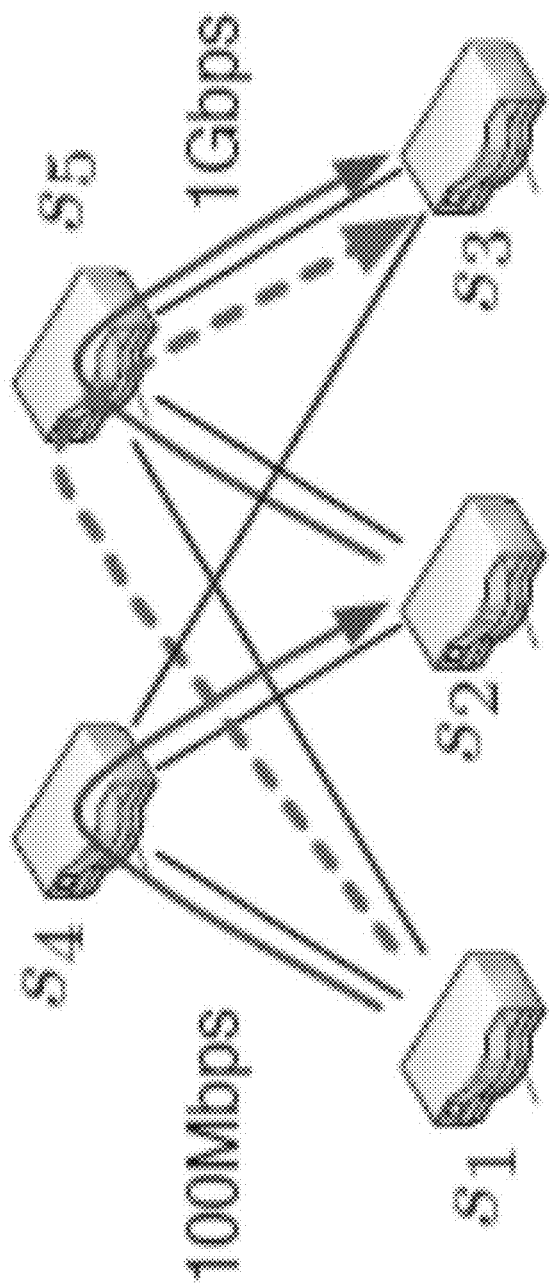
FIG. 2 illustrates data flows within an exemplary network utilizing a local congestion monitoring protocol.

As described earlier ECMP is a protocol used to transmit data flows around a network. ECMP is congestion agnostic i.e. does not really compute congestion within the network. It is therefore necessary to implement a congestion aware load balancing protocol to manage data flows to maintain speed, efficiency and data integrity within the network. Local congestion monitoring protocols are commonly used. FIG. 2 shows an example of where decision based on local congestion information leads to a sub optimal result. A flow of 100 Mbps is traversing the path (s1, s4, s2), and another flow of 1 Gbps is traversing the path (s2, s5, s3). When a new flow (dashed line) arrives at s1, local congestion aware load balancing protocol would send the new flow to s5 without knowing or being aware of the downstream congestion. This would result in poor performance and increase the time of processing.

Existing protocols address this problem by maintaining congestion metrics for all paths between all pairs of ToR switches. For example, in the known CONGA protocol, each ToR switch maintains congestion information of all the paths to other ToR switches. The congestion metrics are obtained by piggybacking in data packets as they traverse the paths, and then fed back to the source ToR switch. This approach is useful in 2 tier leaf spine topologies because the number of states to track and maintain is relatively small as compared to 3 tier networks. For example even in a large 2 tier leaf-spine topology with 576 40 Gbps ports paired with 48 port leaf switches, each leaf switch only needs to track approximately 7K paths. This presents a scalability issues in 3 tier Clos topologies such as network 100. In 3 tier topologies collecting congestion information or metrics for all paths is challenging because the number of paths to monitor increases significantly (i.e. by two orders of magnitude.) As shown in FIG. 1, a 3 tier Clos network has nm paths between a pair of ToR switches in different pods. Thus each, ToR needs to track 0 (nmpr) paths for all possible destination ToR switches. This is a large amount of information that is quite difficult to implement and the information collected must reflect the real time status of each path, as congestion can change rapidly due to bursty flows and exponential rate throttling in TCP. Further maintaining up to date congestion information becomes more challenging when the number of paths increases. The per-path feedback design such as the CONGA protocol requires at least 0 (nmpr) concurrent flows to cover all the paths of a ToR switch at the same time, which is quite difficult to achieve.

The present invention proposes a congestion monitoring process that is scalable and reliable. The congestion monitoring process 600 provides a local congestion monitoring process or protocol. In the local congestion monitoring process 600 each switch monitors the egress and ingress congestion metrics of all of its uplinks within the network. The location congestion monitoring process 600 would require each ToR switch to maintain 2n states for the n uplinks connected to the aggregation tier, and 2m states at each aggregation switch for the m uplinks connected to the core tier. Real time congestion state can be readily gathered and updated whenever a data packet enter and leaves the switch, and does not require any piggybacking.

The local congestion monitoring process 600 is implemented and run by the ToR and aggregation switches for all uplinks that connect them to upstream switches. This arrangement covers the entire in-network path without the links connecting the host and the ToR switches, which are unique and not part of the load balancing. The local congestion monitoring process uses link load as the congestion metric or congestion information, which is effective and can be readily implemented in the hardware.

Figure 3:
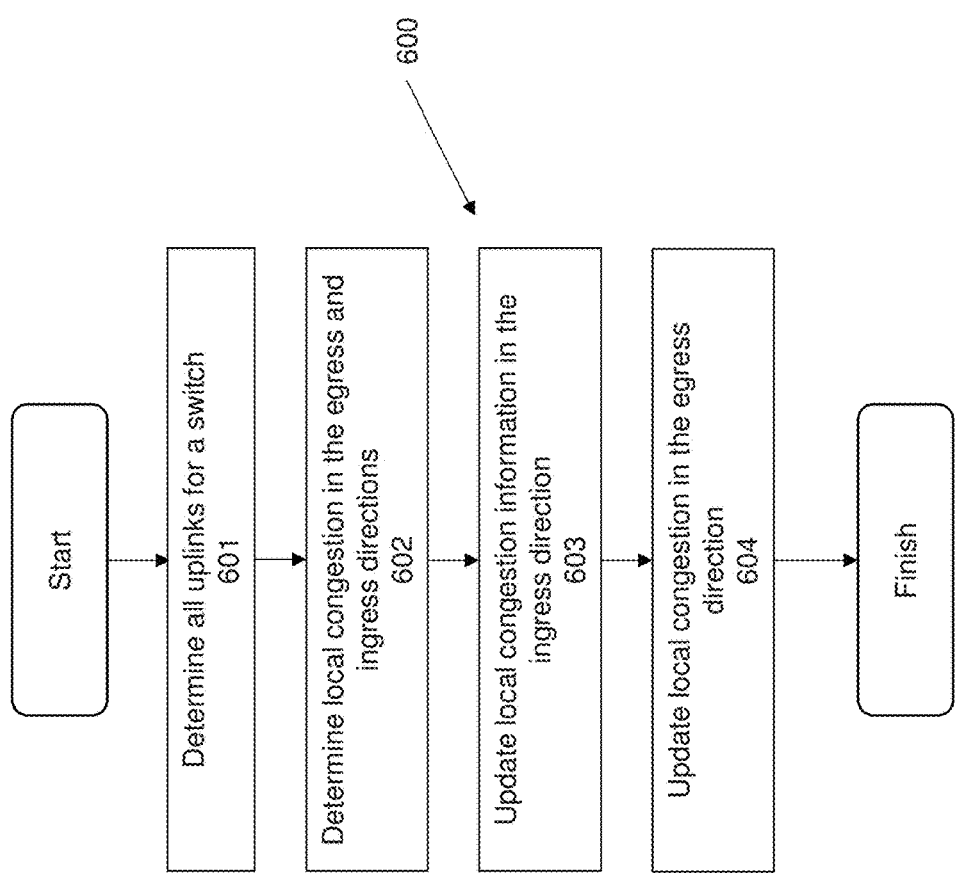
FIG. 3 illustrates a flow diagram for a local congestion monitoring process that is used as part of the method of load balancing.

The local congestion monitoring process 600 comprises the step 601 of determining all uplinks for a switch, i.e. a ToR switch or aggregation switch. FIG. 3 shows an exemplary embodiment of the local congestion monitoring process 600. As shown in FIG. 3, step 601 is determined by each switch in the network and the uplinks are determined in both the egress and ingress directions. The process 600 proceeds to step 602 at which each switch determines the local congestion in both the egress and ingress directions. The local congestion metric is the link load in the egress and ingress direction. At step 603 the switch updates the local congestion information in the ingress direction based on a number of packets or bytes entering the switch via one of the corresponding uplinks. At step 604 the switch updates the local congestion information in the egress direction based on a number of packets or bytes leaving the switch via the corresponding one of the plurality of uplinks.

The local congestion information i.e. link load can be stored at each switch. The local congestion information is updated in real time throughout the network at least at each ToR switch. This is advantageous because real time congestion data is tracked or monitored. Alternatively the local congestion information i.e. the link load information is stored in a congestion table. The congestion table or congestion information is transmitted with the packets as the data packets are transmitted by a particular switch in the network to other switches. The congestion data is constantly updated whenever a packet enters and leaves a switch.

The local congestion monitoring process 600 determines link load using a Discounting Rate Estimator (DRE). DRE maintains a register X which is incremented every time a packet is sent/received over the link by the packet size in bytes, and is decremented every $T_{dre}$ with a factor of α between o and 1. $T_{dre}$ is a time increment. In the example implementation $T_{dre}$ is set to 20 microseconds and α is set to 0.1. The link load information is quantized into 3 bits relative to the link speed.

The congestion information across the network is aggregated to obtain a path-wise congestion. A two stage path selection process 700 is implemented as part of the present invention. The two stage path selection process 700 allows for efficient aggregation information with minimal overhead. The two stage path selection 700 involves two switches at step of the process. The two stage path selection 700 determines an optimal path for a data flow, the optimal path relating to the path that has lowest congestion. The congestion monitoring process as described earlier can be used to determine the congestion information at any switch, the congestion information being used by the two stage path selection method 700. The implantation of the methods 600 and 700 as described result in a congestion aware load balancing method that is implemented in the network. The 3 tier Clos networks comprise a salient structural property defined as a pairwise connectivity. In a 3 tier Clos network, an aggregation switch of ID i only connects to aggregation switches of the same ID i in other pods. This is because these aggregation switches connect to the same core plane. Thus no matter which aggregation switch the source ToR switch chooses to transmit to, a data packet always goes via an aggregation switch of the same ID in the destination pod.

Figure 4:
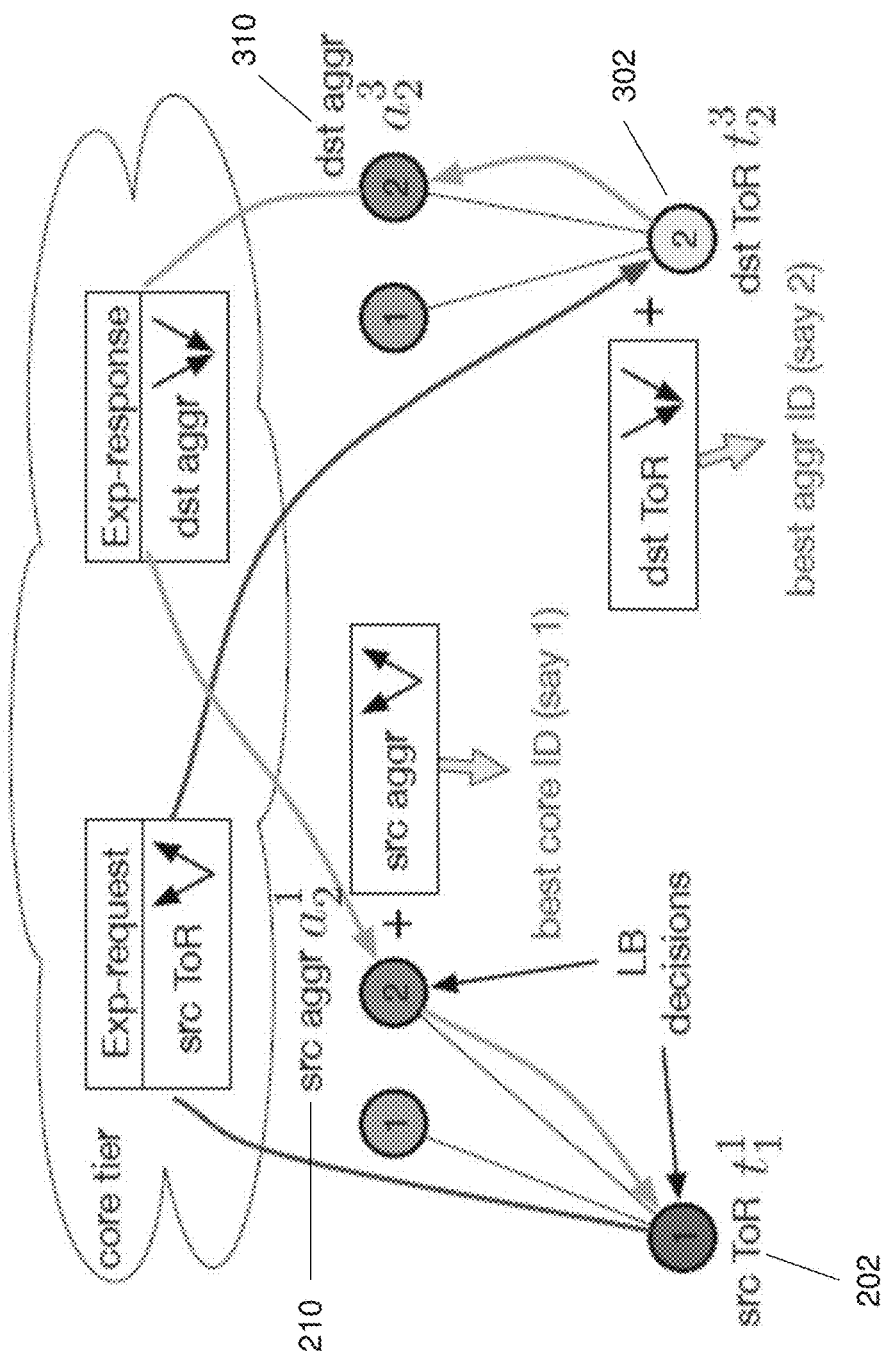
FIG. 4 shows an embodiment of a 3 tier Clos network with a two stage path selection process being implemented.

The two stage path selection process 700 utilizes this pairwise connectivity property to function. FIG. 4 shows an embodiment of the two stage path selection process 700 being implemented in a portion of the 3 tier Clos network 100.

There are four hops between any two ToR switches in different pods. Hops are a portion of the path between the source and destination, i.e. a hop is a portion of the pathway between two ToR switches in different pods. The first stage of the two stage path selection process 700 selects the best aggregation switches (the first and last hop) using the congestion information of the first and last links. In a second stage the method 700 determines the best core switch to use (i.e. the second and third hop) using the congestion information of the second and third links.

Figure 5:
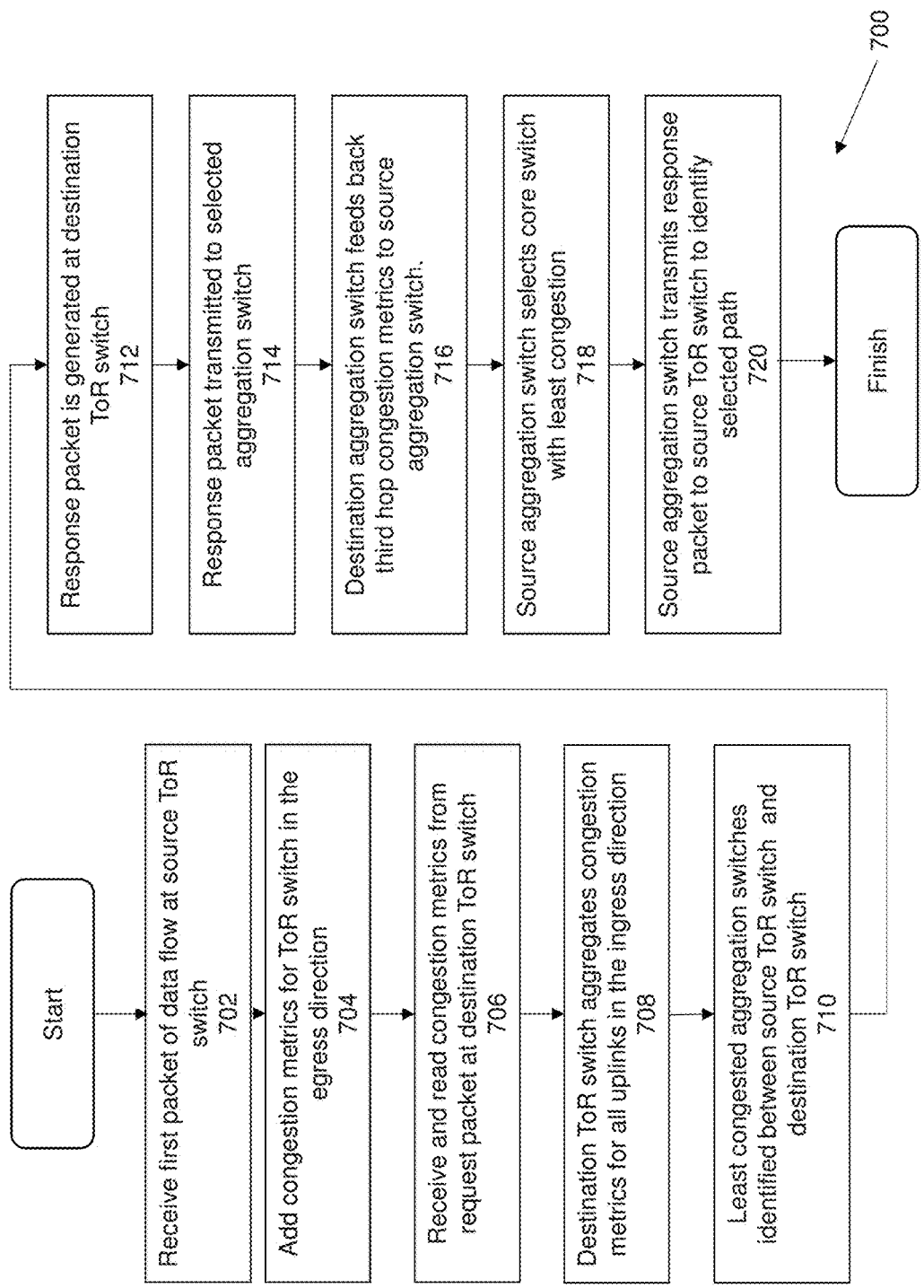
FIG. 5 illustrates a flow chart of the two stage path selection process that is part of the method for load balancing.

FIG. 5 shows a flow chart of the two stage path selection process 700. The process begins at step 702 when the first packet of data flow arrives at a ToR switch i.e. a source ToR switch. The source ToR switch labelled src ToR $t_1^1$ (i.e. 202), in FIG. 4 tags the first packet to add first hop information i.e. the egress congestion metrics of its uplinks, at step 704. This modified data packet acts as a request packet. The destination ToR switch labelled dst ToR $t_2^3$ (i.e. 302) receives and reads the congestion metrics from the request packet at step 706. At step 708 the destination ToR switch 302 aggregates with its ingress metrics of all its uplinks. At step 710 the least congested aggregation switches are identified between the source ToR switch 202 and the destination ToR switch 302. At step 712 a response packet is generated at the destination ToR switch 302. At step 714 the response packet is transmitted or sent to the chosen destination aggregation switch labelled dst aggr $a_2^3$ (i.e. 310). At step 716, the destination aggregation switch 310 feeds back the third hop congestion metrics to the source aggregation switch labelled src aggr $a_2^1$ (i.e. 210). The source aggregation switch 210 selects the core switch with the least effective congestion at step 718. At step 720 the source aggregation switch 210 transmits the response packet to the source ToR switch 202 (i.e. src ToR $t_1^1$) to identify selected path for data flow. The selected path is path with minimal congestion hence this allows the method of load balancing to balance the data loads across the network and reduce congestion at any one switch or location.

The path selection process is completed by generating a request packet and a response packet i.e. by generating a request message and a response message, in a single round trip between a source ToR switch 202 and a destination ToR switch 302. The path selection decisions i.e. the selected paths are maintained or stored at the source ToR switch and the identified aggregation switches. The two stage path selection process requires two switches at each stage of exchange information. For a new TCP connection, the method 700 selects paths for the two flows in both directions independently during the handshaking process and does not cause any packet reordering. The two stage path selection is a heuristic since it does not explore all available paths, hence making the method faster and reducing resource needs. The problem of path selection is simplified from choosing the best combination of aggregation and core switch IDs to choosing sequentially.

The path selection method 700 and congestion monitoring method 600 are implemented as a distributed protocols, with all functionalities residing in the switches of the network. The path selection method 700 and congestion monitoring method 600 are implemented on a per-flow basis for implementation simplicity.

The path selection decisions are maintained in a path selection table (PST) 6000. The PST is maintained in each ToR switch and aggregation switch. As part of the two stage path selection process only the northbound pathlet of a data flow's path needs to be recorded, as there is a unique southbound path from a given core or aggregation switch to a given ToR switch. Northbound means the pathlet from a source ToR switch outward toward the destination ToR switch.

The path selection table will now be described in greater detail with respect to FIG. 6 which shows an example of a path selection table layout. Each PST entry records a flow ID 6002 obtained from hashing five-tuple, the egress port selected 6004, a path selection status (PSS) 6006 bit indicating whether path selection has been completed (1) or not (0), and a valid bit 6008 indicating whether the entry is valid (1) or not (0). An example path selection table (PST) is shown in FIG. 6.

When a packet arrives at a switch, the PST is considered based on its flow ID. If an entry exists and is valid, the packet is routed to the corresponding egress port. If the entry is invalid and the PSS bit is 1, or no entry exists, then the packet represents a new flow and starts a new round of path selection. The valid and PSS bits are set when a path has been selected. The PSS bit ensures path selection is performed only once. An invalid PST entry with a zero PSS bit does not trigger path selection when subsequent packets for the flow or a portion of the flow (i.e. flowlet), if any, arrive before path selection completes.

The PST entries time out after a period of inactivity in order to detect inactive flows and force a new path to be selected. The entries are cleared from the PST when there is inactive flow along a particular path of aggregation switches and core switches to effectively re-open that path or identify that the path is clear with minimal congestion. When an entry times out the valid bit is reset. In one embodiment the time out value for the PST is set at 100 milliseconds. Other time out values such as up to 500 milliseconds are contemplated. The PST time out values could be as low as 1 millisecond.

In alternative embodiments and depending on the network topology and processing requirements of the network other time out values in the microsecond ranges are also contemplated, such as for example between 20 microseconds and 500 microseconds.

Preferably the time out value is large enough is large enough to filter out bursts of the same flow since the path selection occurs on a per-flow basis. The timer can be implemented using just one extra bit for each entry and a global timer for the entire PST 6000.

The use of a PST such as the exemplary PST of FIG. 6, is advantageous because it maintains a per flow state at switches which is against conventional load balancing and path selection protocols being used. The cost of implementing a two stage path selection process 700 and a PST 6000 as described is low for a data center network. The method 700 as described is scalable and can be applied to networks of any size because the method is applied in a per flow basis and involves determining and aggregating congestion between two switches at any time rather than trying to aggregate congestion information for every switch in the network. In the example Clos network 100, the number of concurrent data flows would be less than 8K for an extremely heavily loaded switch. The PST 6000 is preferably 64K entries long. A PST of 64K entries is large enough to cover all scenarios in at least the exemplary 3 tier Clos network 100.

Figure 7:
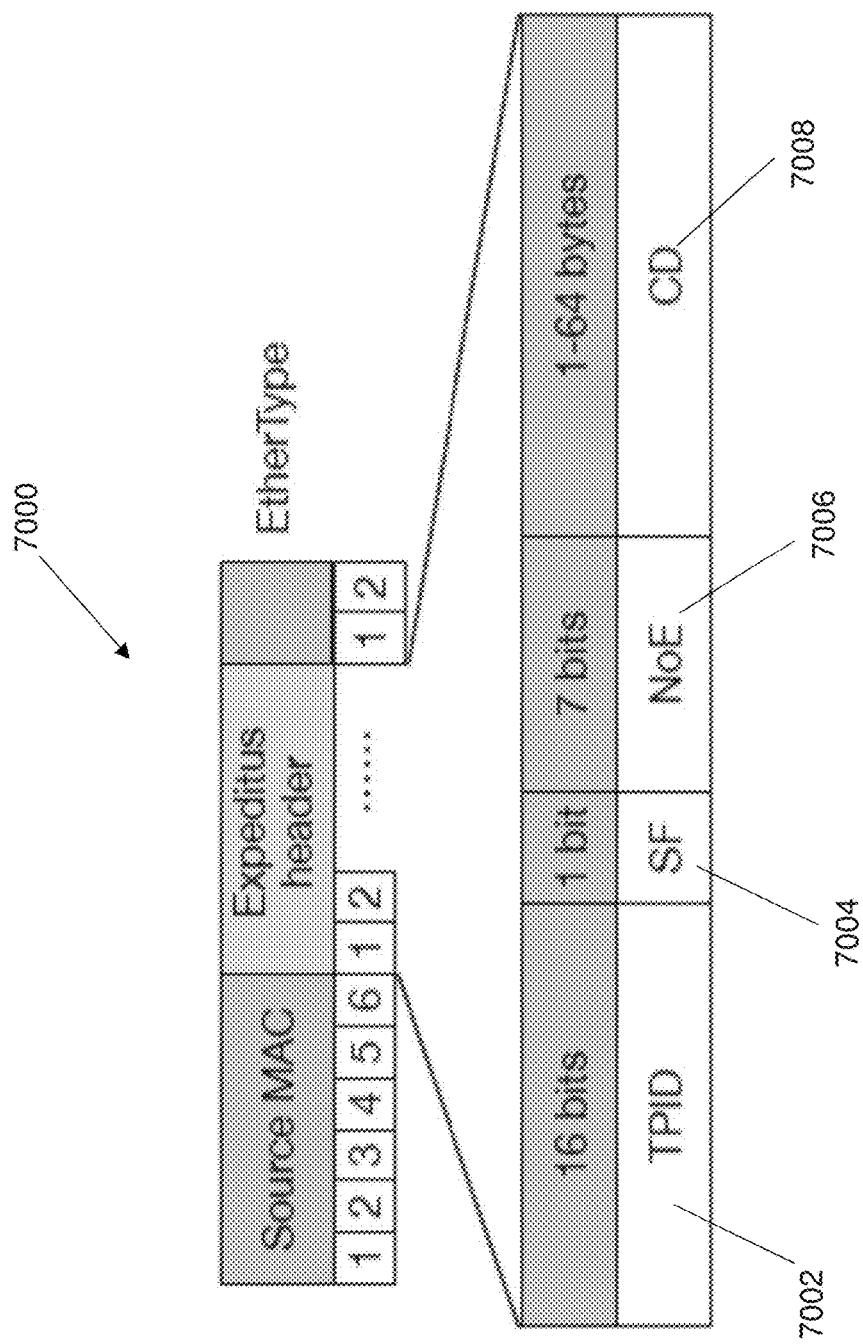
FIG. 7 shows an exemplary Ethernet header and the structure of the exemplary Ethernet header.

The present invention uses dedicated Ethernet tags on IP packets during implementation of congestion aware load balancing in a three tier network. Ethernet tags can be similar to IEEE 802.1Q VLAN tagging to exchange congestion information between various switches, within the network 100, during the two stage path selection process 700 to record and transmit information between the network switches. A new Ethernet header field is added between the source MAC address and the EtherType/length fields. The structure of the new field and the Ethernet header 7000 is shown in FIG. 7. The Ethernet header 7000 comprises a Tag protocol identifier, TPID 7002 that acts as a first tag to identify the packet as a request packet or a response packet. This field is set to 0x9900 to identify the packet as a path selection packet that is used during the path selection process 700. The Ethernet header field comprises a stage flag, SF bit 7004. This field identifies which stage the packet serves (0 for the first stage, 1 for the second stage). A tagged packet for the first stage denotes a request packet and the second stage denotes a response packet. The packet further comprises a 7 bit sequence for number of entries (NOE) 7006. This 7 bit field identifies the number of congestion metrics (i.e. link loads), carried in the packet. At most the NOE field 7006 may comprise 128 bits. The header 7000 further comprises the actual congestion data (CD) or congestion information 7008. The congestion metrics i.e. congestion information is arranged in 4 bit sequences with the first bit as padding. As shown in FIG. 7, the congestion information occupies 64 bytes of the packet.

Figure 8A:
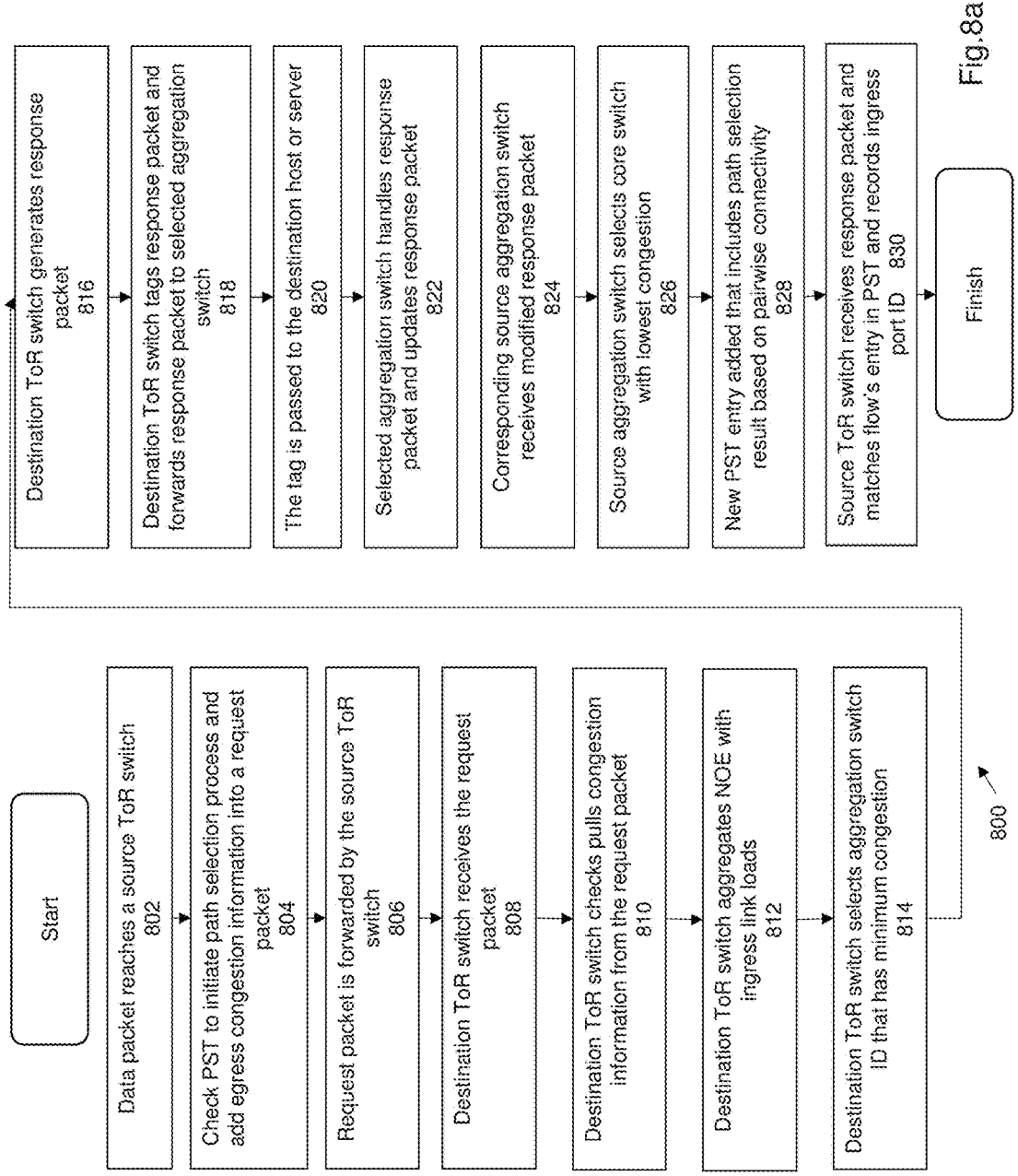
FIG. 8a provides a flow chart of one method of load balancing in accordance with this invention.
Figure 8B:
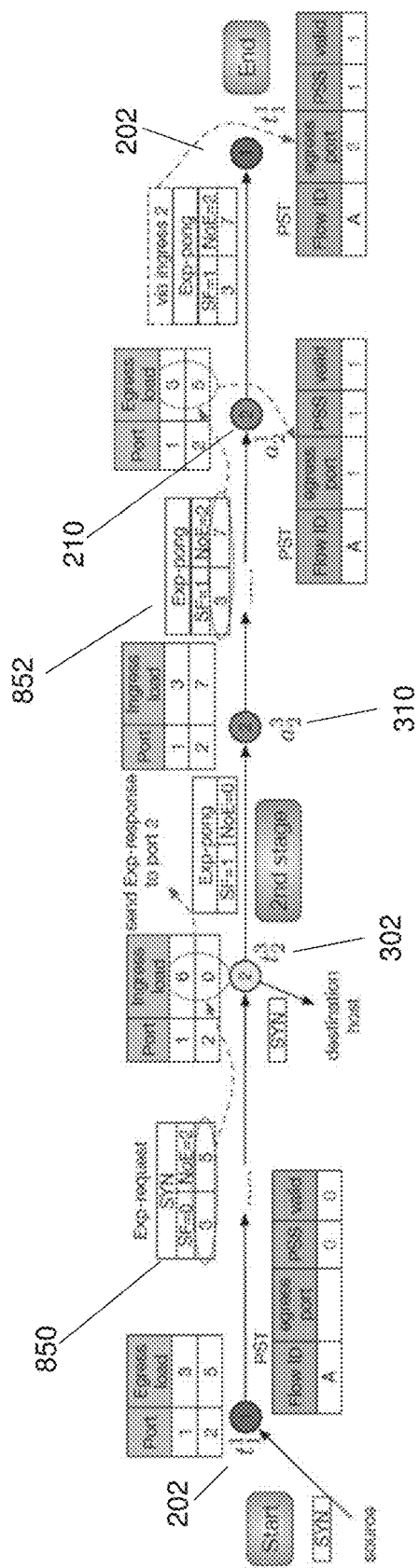
FIG. 8b illustrates load balancing for two data flows A and B in the topology of a network as per FIG. 4.

FIG. 8a shows a flow chart of one method of load balancing 800 according to the present invention. FIG. 8b shows an exemplary implementation of the load balancing method 800 with respect to ToR switches and aggregation switches in the network. The method or process of load balancing 800 comprises a congestion monitoring process and a two stage path selection process. The congestion monitoring process is a localized process that determines the congestion at a switch in the network 100. The congestion monitoring process used as part of the load balancing method 800 can be similar to the method 600 as described earlier. The two stage path selection process used as part of the load balancing method 800 can be similar to the method 700 as described. The method 800 is implemented as a distributed protocol with all functionalities residing in the switches of the network i.e. within the hardware elements of the network.

FIG. 8b illustrates load balancing for two data flows A and B in the topology of a network as per FIG. 4. It should be understood that the method load balancing in a network can be used with any three tier topology and is particularly useful for a 3 tier Clos network topology as shown in FIG. 1.

There is a new TCP connection between hosts or server under ToR switch $t_1^1$ (i.e. ToR switch 202) and ToR switch $t_2^3$ (i.e. ToR switch 302). Flow A is the flow of data in the forward direction from ToR switch 202 to ToR switch 302, or more specifically from a server/host under ToR switch 202 to a server/host under ToR switch 302.

Flow B is in the reverse direction. The load balancing process or method 800 is applied by the switches independently for each flow and the path for each flow is independently determined and established. As stated the two stage path selection process and the congestion aware load balancing method is established on a per-flow basis to determine an optimal path of least congestion for each flow independently.

The first packet in flow A is labelled SYN. The packet reaches its source ToR switch $t_1^1$ (i.e. ToR switch 202) at step 802. At step 804 the path selection process or mechanism is initiated by checking the PST i.e. path selection table. $t_1^1$ (ToR switch 202) tags the packet with its egress link loads (i.e. congestion information or metrics), sets SF to 0 and sets NOE accordingly. SF being set to 0 identifies that the two stage path selection is in the first stage of path selection.

At step 806 the tagged packet i.e. the request packet, is forwarded by ToR switch 202 and inserts a new entry in the PST with the PSS bit set to 0. The aggregation switches ignore the request packet 850 and simply forward the request packet 850. The destination ToR switch $t_2^3$ (i.e. ToR switch 302) receives the request packet 850 at step 808. At step 810 the destination ToR switch 302 checks the NOE field, and pulls the congestion information or data from the request packet. At step 812 the destination ToR switch 302 aggregates the NOE entry by entry with its ingress link loads using the pairwise connectivity. The ingress link loads i.e. the ingress congestion data related to aggregation switches in the aggregation tier are identified using the destination ToR switch ID and pairwise connectivity as described. The effective congestion of all the n paths (i.e. all the aggregation switch paths) between the source ToR switch and the aggregation tier are determined simply as the maximum load of the two hops i.e. partial paths between the source ToR switch and the aggregation tier, and the aggregation tier to the destination ToR switch.

At step 814, the destination ToR switch selects the aggregation switch ID with the minimum effective congestion, which is port 2 in the illustrated example of FIG. 8b. The destination ToR switch 302 generates a response packet 852 at step 816 without payload by copying the TCP/IP headgear from the request packet and swapping the src and dst IP addresses. At step 818, the destination ToR switch 302 tags the response packet 852 with SF being set to 1 and forwards the packet to the selected aggregation switch corresponding to the selected ID, which in the illustrated embodiment is aggregation switch a $a_2^3$ (i.e. aggregation switch 310). The tag from the request packet is forwarded to the destination host or server at step 820. This completes the first stage of the two stage path selection process 800.

The second stage is similar and involves the use of the aggregation switches choosing the path to the core tier using the response packet. As per FIG. 8b, at step 822 the selected aggregation switch 310 (i.e. $a_2^3$) handles the response packet 852 with NOE set to 0 b adding its ingress loads and setting NOE accordingly. In the illustrated embodiment of FIG. 8b, the selected aggregation switch is termed destination aggregation switch. The source aggregation switch $a_2^1$ (i.e. aggregation switch 210) receives the modified response packet 852 at step 824. The source aggregation switch corresponds to the destination aggregation switch based on pairwise connectivity. The source aggregation switch 210 reacts to the modified response packet 852 with a non-zero NOE value by comparing the ingress loads at aggregation switch 310 ($a_2^3$) with its own egress loads, and selecting the core switch with the lowest load, which in this case is core switch ID (1), at step 826. The source aggregation switch 210 i.e. ($a_2^1$) computes flow A's ID by swapping the src and dst IP addresses. At step 828 source aggregation switch inserts a new PST entry or updates an existing entry for flow A, records 1 as the path selection result (based on pairwise connectivity), and sets both PSS and the valid bit to 1. Finally at step 830, the source ToR switch $t_1^1$ (i.e. 202) receives the response packet 852, matches it with flow A's entry in the PST, records its ingress port (2 in this case) in the entry as the path selection result, and sets both the PSS and the valid bit to 1 and discards the response packet. This concludes flow A's path selection.

Flow B's path selection is done exactly in the same way. The only difference with flow B is that flow B's source ToR switch is $t_2^3$ (i.e. ToR switch 302). The new source ToR switch 302 receiving the first packet begins the two stage path selection process as disclosed except in reverse direction. The selected aggregation and core switches may be different to the ones identified and selected for flow A. Note: flow B has not been shown in FIG. 8. The two stage path selection process as described does not cause packet reordering when path selection is done during TCP handshaking.

Below are two algorithms that present the path selection and packet processing logic for ToR and aggregation switches. Algorithm 1 outlines the algorithm used for the first stage of the two stage path selection process. Algorithm 2 below outlines the algorithm used for the second stage of the two stage path selection process. Algorithm 1 and algorithm 2 are exemplary algorithms and other algorithms that achieve the similar functionality as the described two stage path selection can be used.

Algorithm 1 used by the ToR switches in the first stage of path selection:

```
1:  procedure ToR_SWITCH _PROCESSING(packet p)
2:      if p is northbound to the aggregation tier then
3:          if a PST entry e exists for p then
4:              if e. valid_bit == 1 then
5:                  forward p according to e, return
6:              else if PSS == 0 then
7:                  forward p by ECMP, return
8:              add the Expeditus tag to p           ▷ Start path selection
9:              SF ← 0, add the egress loads, forward p by ECMP
10:             insert a new PST entry or update the existing one for p, PSS
    ← 0, valid_bit ← 0, return
11:         else                                    ▷ southbound packet
12:             if p is Expeditus tagged then
13:                 if p. SF == 0 then              ▷ Exp-request received
14:                     check NoE, pull CD
15:                     choose the best aggregation switch ID f *
16:                     generate an Exp-response p', p'. SF ← 1,
    p'. NoE← 0
17:                     p'.src_ip ← p.dst_ip, p'.dst_ip ← p. src_ip
18:                     forward p' to aggregation switch f *
19:                     remove the tag from p, forward it, return
20:                 else                            ▷ Exp-response received
21:                     record p's ingress port $p_i$
22:                     find the PST entry e for the flow f,
    f. src_ip = p.dst_ip, f.dst_ip= p.src_ip
23:                     e.egress_port ← $p_i$, e.PSS ← 1, e.valid_bit ← 0,
    discard p, return
```

In algorithm 1 ECMP is used to transmit the initial packet as part of the path selection process. Exp-request describes the request packet. Exp-response describes the request response. The algorithm 1 is implemented as a distributed protocol within the network and is implemented by the ToR switches within the network 100.

Algorithm 2 below is the algorithm used by the aggregation switches to identify the core switches as part of the second stage of the path selection process.

```
1: procedure AGGR_SWITCH _PROCESSING(packet p)
2:      if p is northbound to the core tier then
3:          if p is Expeditus tagged, p. SF == 1 then   ▷ Exp-response,
    first hop
4:              add the switch's ingress loads to p, set p.NoE
5:          if a PST entry e exists for p then
6:              if e.valid_bit = 1 then
7:                  forward p according to e, return
8:              forward p by ECMP, return
9:      else                                           ▷ southbound packet
10:         if p is Expeditus tagged, p. SF == 1, p.NoE is non-zero then
11:                                                    ▷ Exp-response, third hop
12:             check NoE, pull CD
13:             choose the best core switch ID f *
14:             record port $p_i$ connected to core switch f *
15:             find the PST entry e for the flow f, f.src_ip= p.dst_ip,
    f.dst_ip= p.src_ip, or insert a new entry if not found
16:             e.egress_port ← $p_i$, e.PSS ← 1, e. valid_bit ← 1
17:             forward p, return
```

In the algorithm above Exp-response is the response packet. Algorithm 1 and algorithm 2 as illustrated above are exemplary algorithms that show one exemplary implementation of the first and second stages of the two stage path selection process. The algorithms also illustrate an exemplary method to handle congestion information as part of the path selection process.

The present invention in particular the method of congestion aware load balancing does not have any retransmission mechanism, in case the control packets i.e. request packet or response packet are dropped or lost. The flow of data is not affected by this. There are two possibilities in case a request packet or response packet is lost. In a first possibility the path is not established. In case the any packet that sees an invalid entry is routed using ECMP which is a standard methodology that is used in data networks. In a second case, part of the path is established at the aggregation switch, but not at the ToR switch. Since in this situation the PST entry at the aggregate switch will time out. In case of failure in any part of the two part path selection process, the network 100 is configured to transmit packets using the standard ECMP protocol until the next packet is used. The network 100 reverting to using ECMP protocol is an error handling mechanism as part of the load balancing method.

Failures are the norm rather than the exception in large scale data networks with thousands of switches. The present invention is advantageous because the method for load balancing 800, automatically routes traffic around any congestion caused by failures, thanks to the congestion aware nature of the method 800, delivering better performance over the ECMP process.

Figure 9:
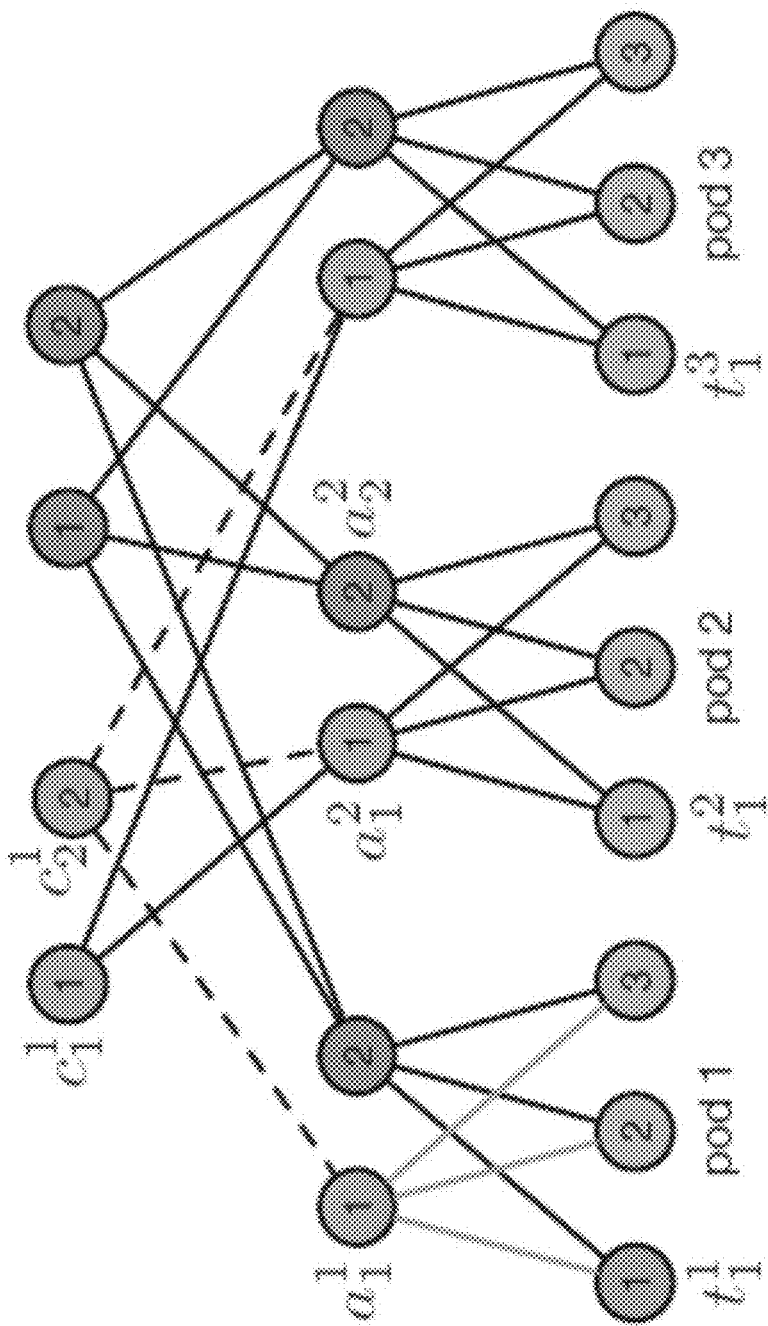
FIG. 9 shows an exemplary implementation of a method of load balancing in accordance with the present invention in the case of a failure.

FIG. 9 shows an exemplary implementation of a method of load balancing in accordance with the present invention in the case of a failure. In the example of FIG. 9, the link $a_1^1$ (202) to $c_1^1$ (402) is damaged or down. This causes the links $c_1^2$ to the first aggregation switches of each pod to be congested (as shown in dashed lines), since these are the only paths to reach $a_1^1$. In this examples, if there are flows from $t_1^2$ to $t_1^1$, the link $a_1^2$-$c_2^1$ is more congested than the two links from $a_2^2$ to the core tier. The data traffic from $a_1^2$ to other pods, say for example pod 3, will be routed to $c_1^1$ in order to avoid the congested link as part of the method or protocol of load balancing based on the congestion determination. In contrast an ECMP protocol would evenly distribute data traffic and further congest the $c_2^1$.

The load balancing method in accordance with the present invention is further advantageous because the two stage path selection method utilizes partial information of a path, and hence sub optimal decisions for certain flows especially for asymmetric network topologies. Consider the above example, as shown in FIG. 9. Suppose there is traffic from pod 1 to pod 2. Due to the failure of $a_1^1$ there is a 50% reduction in bandwidth, and the uplinks from the ToR switches $a_1^1$ to cannot be achieve their full capacity when transmitting inter-pod traffic. Thus these uplinks are actually more likely to be selected in favor of low loads which can exacerbate congestion on $a_1^1$ and $c_1^1$. It should be understood that the ToR switches, aggregation switches and core switches disclosed in FIG. 9 can be switches from the network 100. A unique numbering system has been used in FIG. 9 to better explain how the load balancing method accounts for failures in a network.

The present invention addresses the above issue by using link load multipliers for ToR switch uplinks based on the effective capacity of aggregation switches in the network. Using load multipliers as part of the method for load balancing makes network bottlenecks visible at the ToR switches. The underlying routing protocol i.e. the standard underlying routing protocol being used in network or a control plane or a network controller may inform ToR switches of the aggregate tier to core tier link failure. This notification method is well known. The ToR switches then set a link load multiplier of 2 for the uplink to aggregate switch $a_1^1$ as shown in FIG. 9. The link load multipliers are used as part of the congestion determination process, which is part of the load balancing method. The link load multipliers affect inter pod traffic at the ToR switches. The link loads can be scaled by the multipliers when they are used in the first stage of the two stage path selection process to aggregate congestion information of the ToR switches. The use of the link load multipliers is advantageous because the use of the multipliers proportionally translates the capacity reduction at the aggregation layer to the ToR layer. The ToR switches are more likely to choose uplinks to $a_1^2$ and re-distribute traffic more effectively around the network to balance loads across the network.

The method of load balancing has been described with respect to 3 tier Clos networks but can also be used as a distributed protocol as part of a 2 tier leaf-spine topology. The two stage path selection process reduces to a one stage path selection because only ToR switches are involved. The request packet carries egress loads of the source ToR switch, and the destination ToR aggregates it with its ingress loads to obtain an end-to-end path congestion information for all possible paths. The method selects the path with the least congestion. Aggregation switches ignore the south bound response packet with a zero NOE and forward it. The chosen aggregation switch ID is obtained as the response packet's ingress port when it reaches the source ToR switch. A similar method can be applied to intra-pod traffic.

Figure 10:
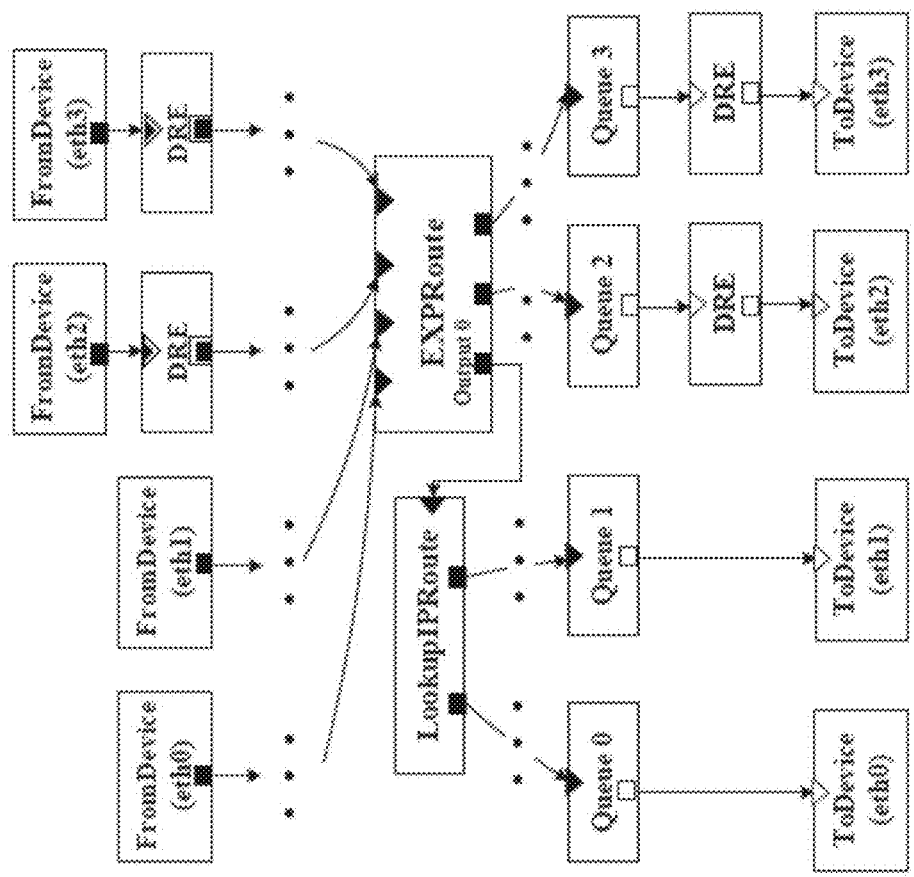
FIG. 10 shows an example prototype constructed using the Click prototyping tool.

In one example experiment performed with one example embodiment of the load balancing method that comprises a local congestion monitoring process and a two stage path selection process, was prototyped using a suitable prototyping tool. A prototype of one example embodiment of a method of load balancing, in accordance with the present invention, has been prototyped using Click, a modular software router for fast prototyping of routing protocols. FIG. 10 shows an example prototype constructed using the Click prototyping tool. Two new Click elements were developed for the prototype. These were DRE to measure link load and EXPRoute to conduct two stage path selection. FIG. 10 shows the packet processing pipeline for the load balancing protocol for a ToR or aggregation switch with 4 ports. Here device eth0 and eth1 are connected by two point to point links to lower tier routers or hosts in the topology. Eth2 and eth3 to upper tier routers. In the Click configuration, EXPRoute handles all incoming packets. If the destination IP address of the packet matches the destination subset of this switch i.e. the pack is southbound, it is emitted on output ⊖and passed to LookupIPRoute as shown in FIG. 10. The LookupIPRoute element then matches destination address with the routing table entries and forwards it to the correct downstream egress port. Otherwise, if the packet is northbound, EXPRoute chooses an egress port according to its two-stage path selection mechanism that can implement a two stage path selection process such as that described in 700.

Implementation of the DRE element, as shown in FIG. 10 will now be described. The DRE element sits next to the FromDevice and ToDevice elements for eth2 and eth3 in the Click configuration as shown in FIG. 10. The DRE element can accurately detect packets sent from/to each link. EXPRoute can obtain ingress link loads from upstream DRE elements and egress link loads from downstream DRE elements. The Click configuration can only achieve millisecond resolution, which affects accurate estimation of link load, which makes DRE react slower than a hardware implementation to link load changes. The prototype experiment shows that the method of load balancing that is implemented as a distributed protocol in a network is possible and works.

Figure 11:
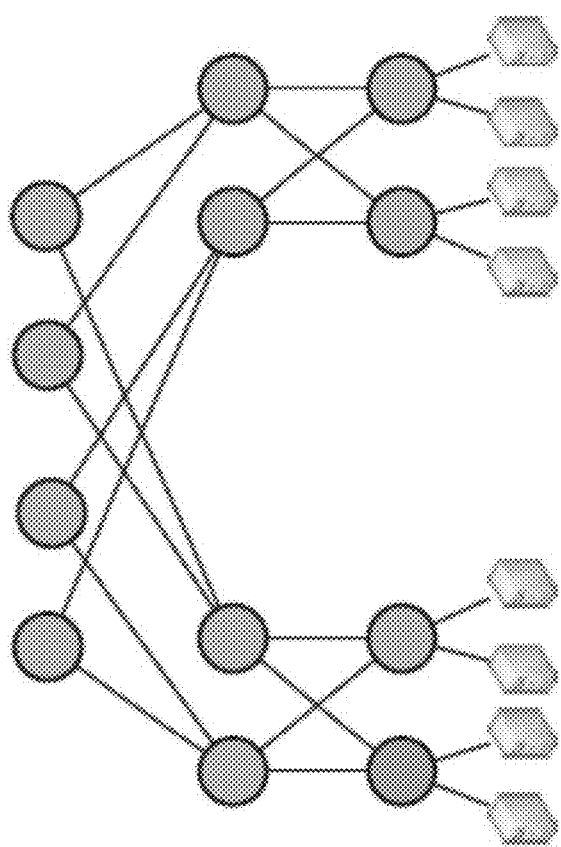
FIG. 11 shows an example of a small scale 3 tier Clos network that is used as part of the testbed for an experiment.

In another experiment a small scale Emulab test bed is used to implement the Click implementation to test the performance of the method of load balancing in accordance with the present invention. FIG. 11 shows an example of a small scale 3 tier Clos network that is used as part of the testbed for this experiment. The Emulab testbed used for this exemplary experiment uses PC3000 nodes to host Click routers, with 64 bit Intel Xenon 3.0 GHZ processors, 2 GB DDR2 RAM, and four 1 GbE NICs. All nodes run CentOS 5.5 with a patched Linux 2.6.24.7 kernel and a patched Intel e1000-7.6.15.5 NIC driver to improve Click performance. A default TCP cubic implementation in the kernel is used as part of the exemplary testbed implementation. The Click implementation as prototyped is operated in the kernel space, and the testbed implementation has resulted in determining that TCP throughput between two Click routers is stable at 940+ Mbps. As part of this exemplary experiment a small scale 3 tier Clos network was set up with 2 pods of 2 aggregation and ToR switches in each pod. Each aggregation switch connects to two core switches and each ToR switch connects to two hosts or servers, as shown in FIG. 11. The core tier is oversubscribed at 4:1 by rate limiting the core links to emulate a realistic setting.

The Emulab test bed was used in an example experiment to evaluate packet processing overhead using the load balancing method or protocol as per an embodiment of the present invention. FIG. 12 illustrates a table that shows average CPU time of forwarding a packet through each element at the source ToR switch sending at line rate, measured with Intel Xeon cycle counters in this experiment. The average value obtained from the total processing time divided by the number of packets. A HashRoute element is used to perform ECMP and measure its processing time. The additional overhead incurred by ExpRoute and DRE elements is determined to be hundreds of nanoseconds. This is a negligible delay as compared to ECMP. The method of load balancing is advantageous over ECMP because it determines congestion and selects a path of least congestion. The latency overhead of the two stage path selection to TCP handshake was also considered as part of the experiment. As part of the latency measurement, a TCP connection is started and a measurement of how long it takes for the sender to start sending the first data packet by which time path selection for both directions are done and cannot affect the flow. The method of load balancing adds a negligible 15 microsecond delay on average over 100 runs, as shown in figure table of FIG. 13. The described experiment shows viability of the method of load balancing in accordance with the present invention.

A further example experiment will now be described. This experiment was conducted to evaluate the performance of the load balancing method with two realistic workloads from production datacenters.

Figure 14:
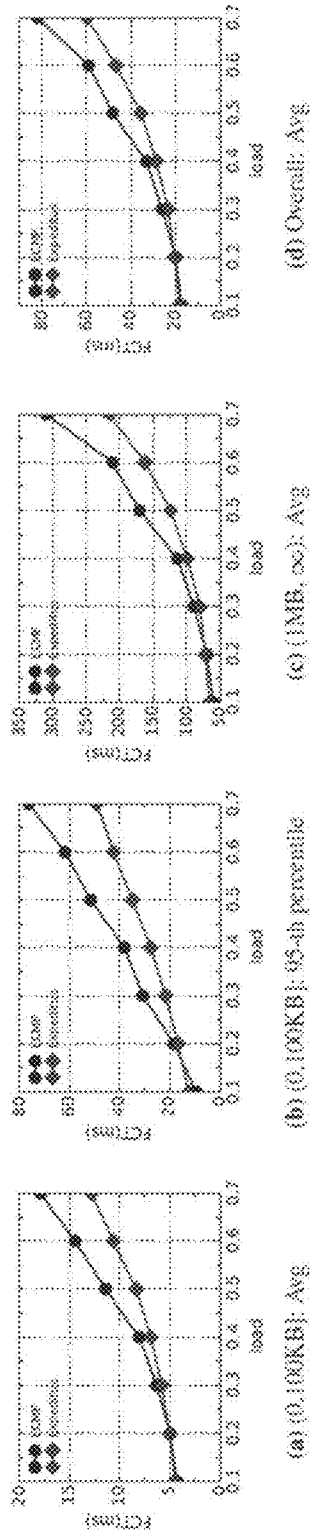
FIG. 14 shows graphs that illustrate the comparison of the method of load balancing as per the present invention and the ECMP protocol for web search workload, in particular the graphs illustrate the FCT results for a web search workload.
Figure 15:
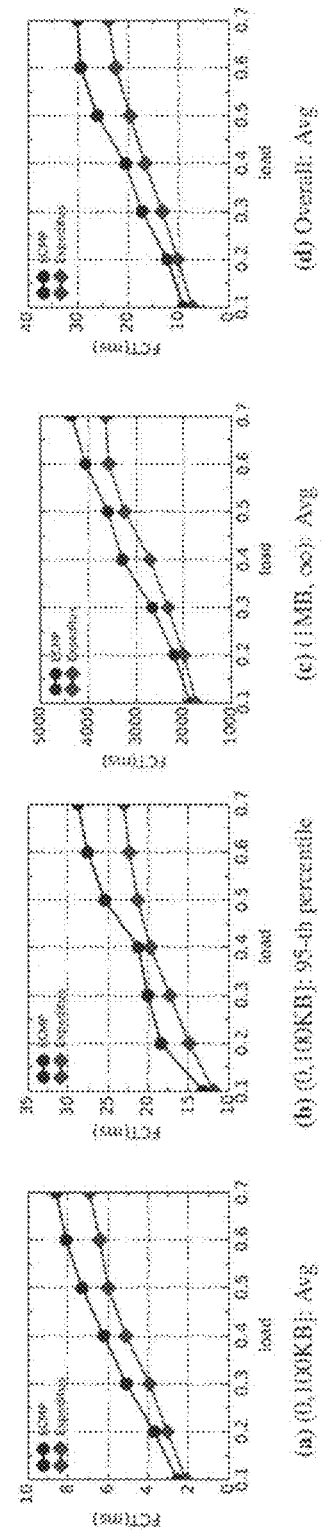
FIG. 15 shows graphs that illustrate the comparison of the method of load balancing as per the present invention and the ECMP protocol for data mining workload, in particular the graphs illustrate the FCT results for a data mining workload.

The first workload was from a cluster running mainly web search. The second workload was from a large cluster running data mining jobs. Both workload distributions were heavily tailed. In the web search workload, over 95% of bytes are from 30% flows larger than 1 MB. In the data mining workload, 95% of bytes are from about 3.6% flows that are larger than 35 MB while more than 80% of the flows are less than 10 KB. As part of this experiment the flows were generated between random senders and receivers in different pods of a testbed network shown in FIG. 11. The data flows were generated according to Poisson processes with varying arrival rates in order to simulate different loads. FIGS. 14 and 15 show the FCT results of the method of load balancing as compared to ECMP for both workloads described. FIG. 14 represents the comparison of the method of load balancing as per the present invention and the ECMP protocol for web search workload. FIG. 15 represents the comparison of the method of load balancing as per the present invention and the ECMP protocol for data mining workload. In the figures the load balancing protocol as per the present invention is titled Expeditus and ECMP is titled ECMP.

The loads were varied from 0.1 to 0.7 beyond which the results become unstable in the testbed. FIGS. 14 and 15 show the FCT statistics for mice flows (<100 KB) and elephant flows (>1 MB). The results of medium flows between 100 KB and 1 MB are largely in line with elephant flows. FCT statistics for medium flows are not shown for brevity. Each data point in the graphs of FIG. 14 and FIG. 15 represent an average of 3 runs. As shown in FIGS. 14 and 15, the method or protocol of load balancing as per the present invention outperforms the ECMP protocol in both average and ninety fifth percentile tail FCT for mice flows. For loads between 0.4 and 0.7 MB the load balancing protocol as per the present invention reduces the average FCT by approximately 14% to 30% in the web search workload and 17% to 25% in the data mining workload. The reduction in tail FCT is even larger by approximately 30% to 45% in web search workload and 5%-30% in data mining workload. The load balancing protocol in accordance with the invention (i.e. Expeditus) also substantially improves throughput for elephant flows in medium and high loads. The reduction in average FCT is 9%-38% for web search workload and 115-18% for data mining work load. The average FCT is much longer in the data mining work load as the elephant flows are much larger than the data mining workload.

A further experiment was conducted to test the performance of the load balancing method (or load balancing protocol) in large scale networks. In this experiment a 12 pod fat tree topology was used as the baseline topology. There are 36 core switches i.e. 36 equal cost paths between any pair of hosts at different pods and a total of 432 hosts or servers. Each ToR switch has 6 connections to aggregation tier and hosts respectively. All links are implemented to run at 10 Gbps. The number of core switches is varied as part of this experiment to obtain different oversubscription ratios at the core tier. The baseline oversubscription ratio is 2:1. Each run of the simulation in this experiment generates more than 10K flows, and the average over 3 runs is used to generate or denote a data point. In this experiment two realistic workloads from production datacenters are used. A first workload being related to a web search workload and a second workload being related to a data mining workload. As part of this experiment the exemplary network is subject to stress tests that comprise three modes that are categorized as Stride, Bijection, Random. In the Stride mode the hosts are indexed from left to right. A server i sends data to host server [(i+M) mod N] where M is the number of hosts in a pod and N the total number of hosts. In the Bijection mode each host sends to data to a random destination in a different pod. Each host only receives data from one sender. Finally in the Random mode each host sends to a random destination not in the same pod as itself. This mode is different from the bijection mode in that multiple hosts may send data to the same destination.

As part of this experiment three load balancing schemes were tested in simulations. The congestion based load balancing method in accordance with the current invention is called Expeditus. In addition to Expeditus, Clairvoyant, and ECMP protocols were tested. The Clairvoyant protocol is an ideal congestion aware scheme that uses complete path-wise information of all possible paths. ECMP is the base line protocol that is used and does not have congestion based or congestion aware properties. The stress tests were performed by generating synchronized flows with three synthetic traffic patterns to evaluate the load balancing performance of Expeditus (i.e. the congestion aware load balancing method in accordance with the present invention). A data flow of 50 MB is generate at from each sender. To vary the degree of synchronization three sets of simulation were conducted with flow inter-arrival times sampled from exponential distributions with means of 0, 30 microseconds and 60 microseconds.

Figure 16:
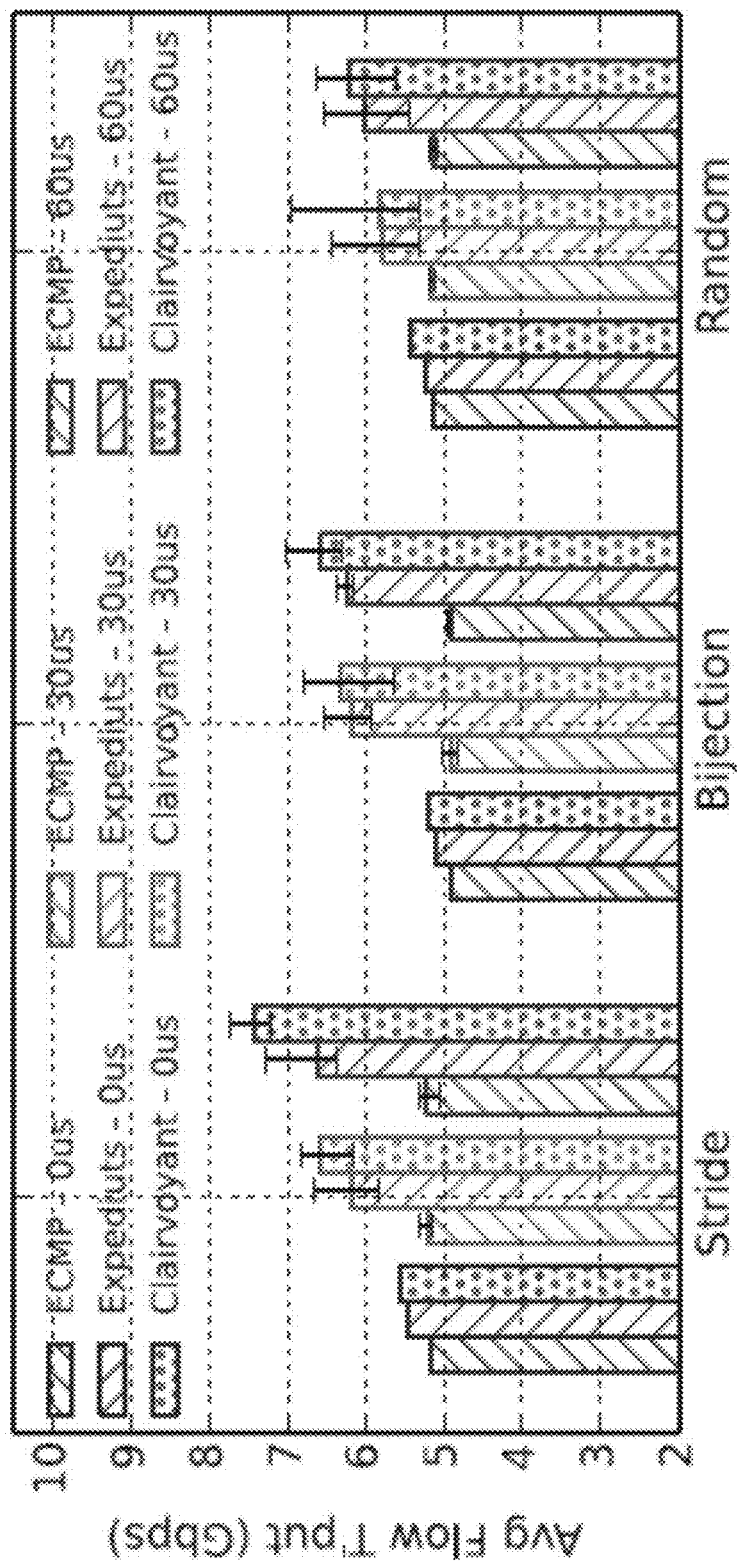
FIG. 16 shows stress test results for different traffic patterns utilized in a 4-pod 10 Gpbs fat tree, that is used as part of a performance experiment.

FIG. 16 shows the average throughput for different schemes or protocols with error bars over 5 runs. In particular FIG. 16 shows stress test results for different traffic patterns utilized in a 4-pod 10 Gpbs fat tree. When all flows start at the same time Expeditus and Clarivoyant perform on par with ECM P. When flows are slightly loosely synchronized, Expeditus is able to choose better paths than ECMP and improve performance. Expeditus improves average throughput by approximately 23%-42% for Stride and Bijection, and by approximately 25% for Random with mean inter-arrival times of 30 microseconds and 60 microseconds. As seen from FIG. 16, the Expeditus protocol performs almost as well as the Clairvoyant protocol. The Clairvoyant protocol is testable in a virtual environment but requires high overheads which make implementation very difficult and expensive. Conversly the Expeditus protocol is easier to implement, requires less processing resource and allows for a highly scalable network design. The Expeditus protocol can be used with changing network sizes easily since the protocol determines a path selection based on two switches only and determines a local congestion metric for each switch in response to a flow of data rather than maintaining a global congestion metrics.

Figure 17:
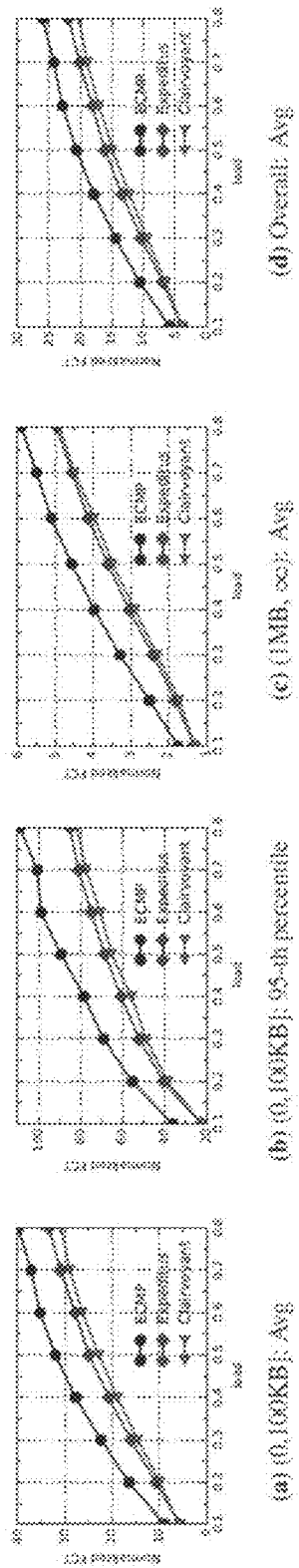
FIG. 17 shows the normalized FCT (NFCT) times for web search workload in a baseline 12 pod fat-tree network with core tier oversubscribed at a ratio of 2:1.
Figure 18:
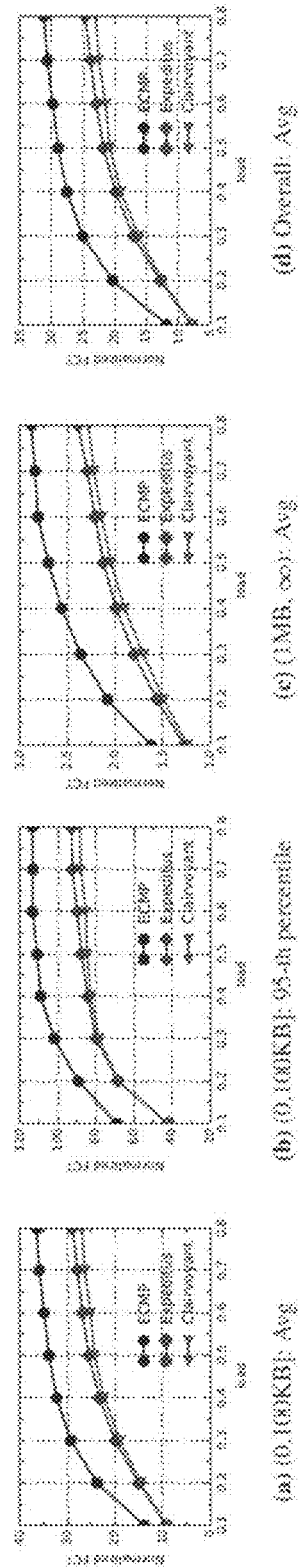
FIG. 18 shows the normalized FCT (NFCT) times for data mining workload in a baseline 12 pod fat-tree network with core tier oversubscribed at a ratio of 2:1.

In a further test the performance of the method of load balancing (i.e. termed as Expeditus by the inventors) was investigated in a large scale Clos network using realistic traffic traces while varying network loads from 0.1 to 0.8. The method of load balancing in accordance with the present invention is a distributed protocol that is implemented by the network switches and network elements. FIG. 17 shows the normalized FCT (NFCT) times for web search workload in a baseline 12 pod fat-tree network with core tier oversubscribed at a ratio of 2:1. These are results of a further performance test/experiment of the present invention. The NFCT value is the FCT value normalized to the best possible completion time achieved in an idle network where each flow can transmit at the bottleneck link capacity. For mice flows, the method of load balancing as per the present invention (i.e. Expeditus) provides 20%-50% FCT reduction at the ninety fifth percentile over ECMP. For elephant flows, Expeditus is also approximately 25%-30% faster on average. The tail and average FCT improvements are more substantial in smaller loads. This is because an idle path is more likely to be found for smaller loads. Moreover, it is clear that performance of Expeditus closely tracks the performance of a Clairvoyant protocol, as seen in FIG. 17. In most cases as seen in FIG. 17 the performance gap is less than 10% demonstrating the effectiveness of the method of load balancing as per the present invention. This is because the method of load balancing is a heuristic path selection design. Similar improvements are observed for data mining workloads. The performance of data mining work-loads is demonstrated in the plots shown in FIG. 18. Based on the results shown in the plots of FIGS. 17 and 18, it can be observed that the method of load balancing (i.e. Expeditus) is more efficient at balancing loads across the network as compared to ECMP. Use of Expeditus reduces the average throughput imbalance as compared to ECM P. The Expeditus protocol also performs better at balancing loads between the ToR to aggregation tier as compared to a Clairvoyant protocol.

Figure 20:
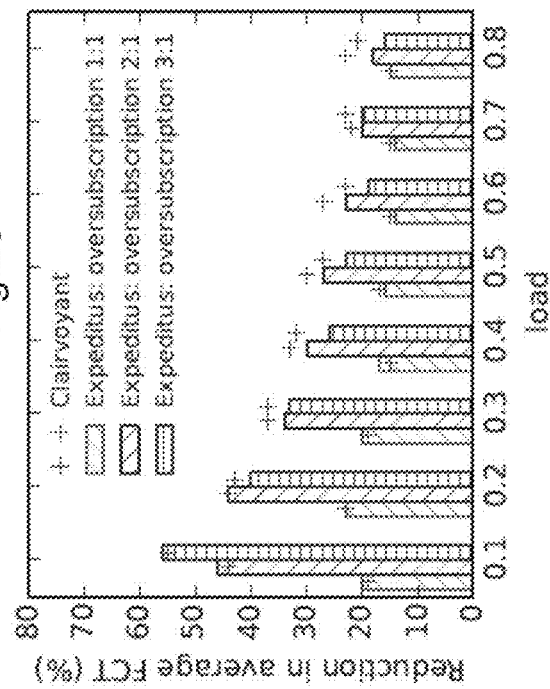
FIG. 20 shows a plot of the average FCT improvement over ECMP protocol for all flows in the baseline topology with varying oversubscription ratios when the ToR tier is oversubscribed with more hosts or servers.
Figure 19:
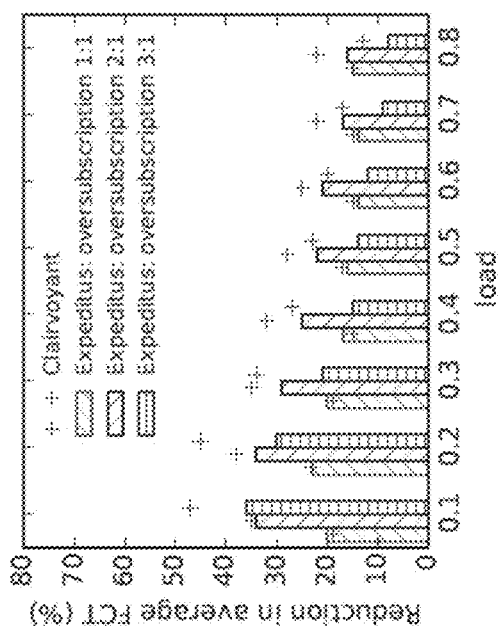
FIG. 19 shows a plot of the average FCT improvement over ECMP protocol for all flows in the baseline topology with varying oversubscription ratios at the core tier.

FIGS. 19 and 20 show plots of an experiment conducted to evaluate the performance of the method of load balancing in accordance with the present invention to resolve network bottlenecks. As described earlier the protocol or method of the present invention is termed as Expeditus. As part of this experiment the severity and location of bottlenecks within the network was varied by varying the oversubscription ratios at different tiers in the topology of the network. FIG. 19 shows the average FCT improvement over ECMP protocol for all flows in the baseline topology with varying oversubscription ratios at the core tier. The plot of FIG. 19 is used to evaluate the impact of bottleneck severity in the network, as part of the performance experiment. Only results for the web search workload is shown for brevity. In general it can be seen from FIG. 19 that Expeditus protocol provides more benefits with more oversubscription at first, and then improvements decrease with an oversubscription ratio of 3. This is because the network is heavily oversubscribed, many elephant flows occupy the paths, diminishing congestion diversity across equal cost paths and due to the congestion aware nature of the Expeditus protocol.

The plot of FIG. 20 is used to evaluate and consider the impact of bottleneck location within the network. FIG. 20 shows the results when the ToR tier is oversubscribed with more hosts or servers. The uplinks of ToR switches instead of aggregation switches are the bottleneck. It can be seen from FIG. 20 that the Expeditus protocol performs better in this setting. The reason is because the path selection process always chooses paths starting at the ToR tier. The path selection process of the load balancing protocol/method (i.e. Expeditus) performs better when the ToR tier is the bottleneck as compared to the core tier being the bottleneck. In summary the method of load balancing as per the present invention performs better than other approaches (i.e. at least in comparison to ECMP protocol) in different topology settings different severity of bottlenecks and different locations of the bottlenecks.

Figure 22:
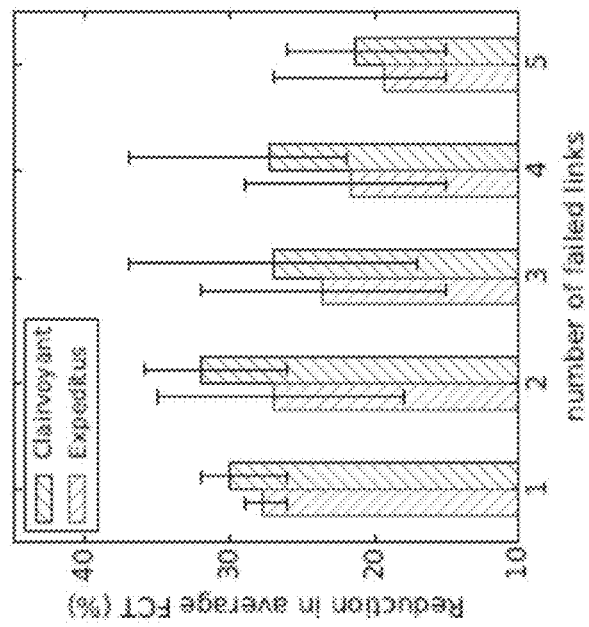
FIG. 22 shows the average FCT reduction when there is a failure in the ToR tier and aggregation tier links.
Figure 21:
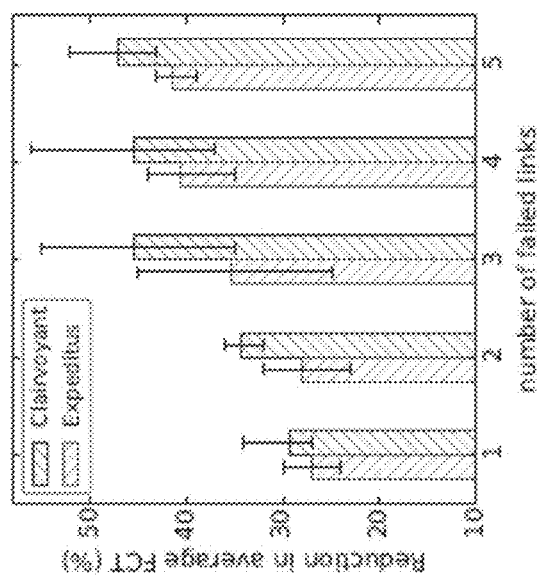
FIG. 21 shows a plot of average FCT reduction when there is a failure in the aggregation tier and core tier links.

A further experiment was conducted to determine the impact of link failures and topology asymmetry. Plots of the results for performance are shown in FIGS. 21 and 22. The experiment was conducted on two pods in the 12 pod non oversubscribed fat-tree topology. The number of failed links was varied as part of the experiment. The links in one pod were selected to fail uniformly at random in each run, with each switch having at most 2 failed links. Only results of the web search workload were plotted. FIG. 21 shows that the average FCT reduction when there is a failure in the aggregation tier and core tier links. FIG. 22 shows the average FCT reduction when there is a failure in the ToR tier and aggregation tier links.

The method of load balancing as per the present invention (i.e. labelled Expeditus) performs better than ECMP as there are more failures in the aggregation tier and core tier links, as shown in FIG. 21. This is because ECMP always hashes flows evenly to all paths without considering the asymmetric uplink bandwidth, thus aggravating the congestion. The method of load balancing (Expeditus) detects high utilization links due to failures using the link load multipliers and congestion monitoring, and hence diverts traffic away from hot spots to balance the loads. As shown in FIG. 21 Expeditus protocol performs almost as well as the Clairvoyant protocol which reinforces the performance benefits of the Expeditus protocol compared to at least ECMP. FIG. 22 shows the result when failures occur in the ToR tier and aggregation tier links. Across the different scenarios that were test the Expeditus protocol provides performance gains between 20% and 70%. In all the method of load balancing 10 as per the present invention is robust against failures in 3 tier Clos networks.

Figure 23:
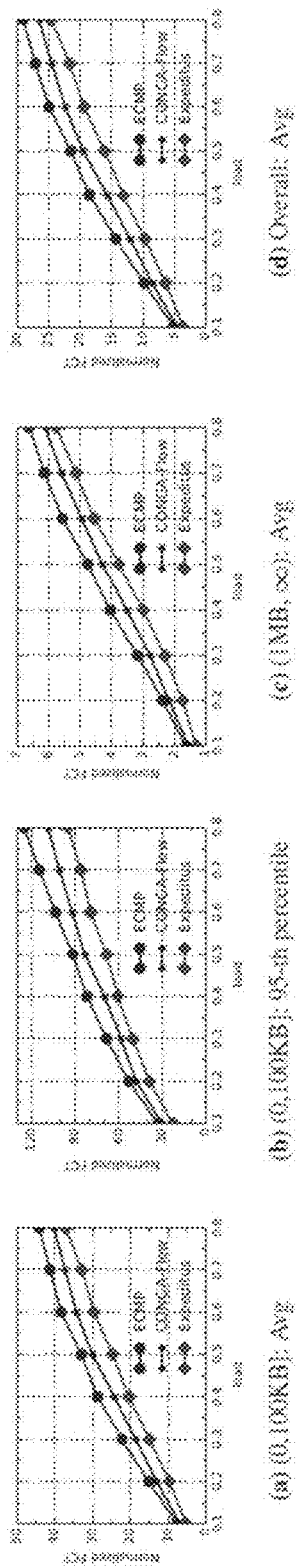
FIG. 23 shows a plot of the normalized FCT results for the web search workload with 8 spine and 8 leaf switches, FIG. 23 being experimental results.
Figure 24:
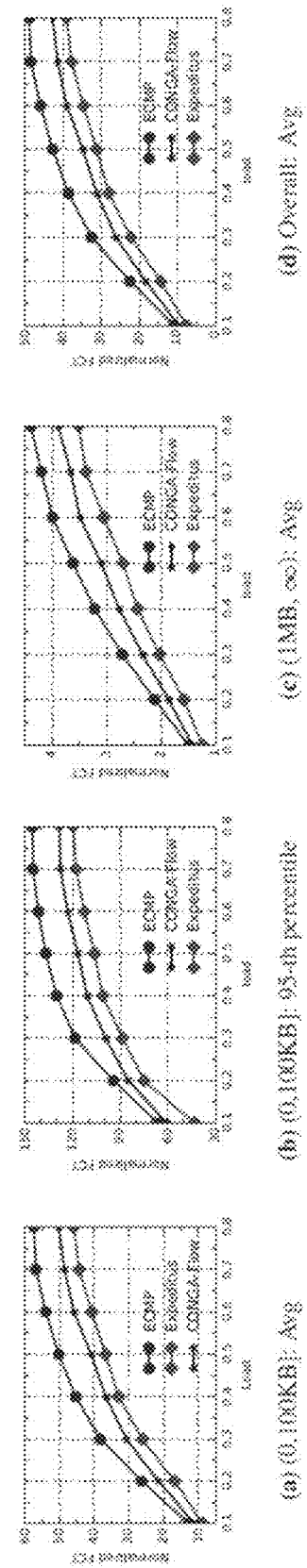
FIG. 24 shows a plot of the normalized FCT results for the data mining workload with 8 spine and 8 leaf switches, FIG. 24 being experimental results.

An experiment was also conducted to determine performance characteristics of the Expeditus protocol (i.e. method of load balancing) for 2 tier leaf spine topologies, as compared to CONGA Flow protocol and ECMP protocol. FIGS. 23 and 24 illustrate various plots of the test results that tracked normalized FCT for different flows. The topology used in these experiments comprised 8 leaf switches, 8 spine switches and 128 hosts or servers. FIG. 23 shows the normalized FCT results for the web search workload, and FIG. 24 shows the results for the data mining workload. It can be seen from the plots that the Expeditus protocol achieves performance gains ranging from 10% to 30% for all flows across all loads. The Expeditus protocol also outperforms the CONGA Flow protocol in all cases.

The above experiments shows the operation of the method of load balancing and illustrate the effectiveness of the method of load balancing as per the present invention. The method of load balancing is advantageous over existing protocols for the various reasons stated herein, and provides a more cost effective, scalable, and better performing method for load balancing data traffic within a network.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for load balancing in a data network comprising a plurality of network switches, the method comprising:

receiving a data flow, initiating a two-stage path selection process to determine a path between a source network switch and a destination network switch, wherein each path between a source switch and a destination switch comprises:

at least a first hop, a last hop and one or more intermediate hops, wherein each hop is a portion of the path between the source switch and the destination switch;

a first stage of the two stage path selection process identifying the first and final hops of the path via which to transmit the data flow to the destination switch, a second stage of the two stage selection process identifying the one or more intermediate hops of the path via which to transmit the data flow to the destination switch;

wherein the first stage of the two stage path selection process identifies an aggregation switch ID, a first hop that corresponds to the path between a source ToR switch and a source aggregation switch in a first pod, and further identifies a second hop that corresponds to a path between a destination ToR switch and a destination aggregation switch in a second pod;

wherein the source aggregation switch and the destination aggregation switch being associated with each other via a pairwise connectivity property, the pairwise connectivity property being such that the source aggregation switch and the destination aggregation switch having the same switch ID and being associated with each other;

the path selection process selecting an optimal path based on congestion information of a first network switch and congestion information of a second network switch, the optimal path corresponding to a path of minimal congestion, and transmitting the data flow along the selected path.

2. The method for load balancing in a data network in accordance with claim 1, wherein the first hop and final hop of the path connecting to one or more aggregation switches having the same switch ID.

3. The method for load balancing in a data network in accordance with claim 1, wherein the first hop being associated with one or more uplinks of the source ToR switch and the final hop being associated with one or more uplinks of the destination ToR switch.

4. The method for load balancing in a data network in accordance with claim 1, wherein the second stage of the two stage path selection process identifies a second hop and third hop of the path, the second hop being associated with uplinks of a source aggregation switch and the third hop being associated with the uplinks of the destination aggregation switch.

5. The method for load balancing in a data network in accordance with claim 1, wherein the second stage of the two stage path selection process identifies a hop between the source aggregation switch and a core switch, and wherein the second stage of the two stage path selection process identifies a hop between the destination aggregation switch and the core switch.

6. The method for load balancing in a data network in accordance with claim 5, wherein the source aggregation switch and the destination aggregation switch connecting to the same core switch.

7. A method for load balancing in a data network in accordance with claim 1, wherein the congestion information of the first network switch and the congestion information is determined by applying a congestion monitoring process at each switch within the network to determine the congestion information of all uplinks associated with the network switch in an egress or ingress direction.

8. A method for load balancing in a data network in accordance with claim 7, wherein the congestion information of the first network switch is the congestion information of all uplinks to the first switch in the egress direction, and the congestion information of the second network switch is the congestion information for all uplinks to the second network switch in the ingress direction.

9. A method for load balancing in a data network in accordance with claim 1, wherein the congestion information is the local congestion information associated with the uplinks of a network switch.

10. A method for load balancing in a data network in accordance with claim 7, wherein the congestion monitoring process comprises determining the local congestion information for one or more network switches in both the ingress and egress directions.

11. A method for load balancing in a data network in accordance with claim 7, wherein the congestion monitoring process further comprises, at each ToR switch, updating the local congestion information in the ingress direction based on the number of packets or bytes entering the ToR switch, and updating the local congestion information in the egress direction based on the number of packets or bytes exiting the ToR switch.

12. A method for load balancing in a data network in accordance with claim 1, wherein the method comprises the additional step of encapsulating the first packet of each data flow with a dedicated header, the header comprising at least the congestion information associated with all uplinks of at least one network switch, the dedicated header being generated by a source network switch.

13. A method for load balancing in a data network in accordance with claim 1, wherein the method comprises the additional steps of:
transmitting the packet with the dedicated header to a destination network switch,
the destination network switch processing the dedicated header to extract the congestion information,
the destination network switch processing the congestion information to identify an intermediate network switch that corresponds to least congestion.

14. A method for load balancing in a data network in accordance with claim 1, wherein the method comprises the additional steps of:
encapsulating the first packet of each new data flow with a dedicated header, the source ToR switch encapsulating the first packet with the dedicated header to create a request packet, and
transmitting the request packet and dedicated header to a destination ToR switch.

15. A method for load balancing in a data network in accordance with claim 1, wherein the method comprises the additional steps of:
receiving the request packet by the destination ToR switch,
processing the request packet to determine a maximum level of congestion of the first and final hops of each path,
selecting an aggregation switch ID that corresponds to the least congestion in the first and final hops, and
generating a response packet and transmitting the response packet to an aggregation switch matching the aggregation switch ID.

16. A method for load balancing in a data network in accordance with claim 14, wherein the request packet comprises a first tag identifying to identify the packet as a path selection request packet, a second tag identifying a stage of the path selection process, a third tag identifying the number of congestion metrics and a congestion data field comprising the congestion information associated with all the uplinks in the egress direction of the source ToR switch.

17. A method for load balancing in a data network in accordance with claim 14, wherein the step of generating the response packet comprises the additional steps of:
copying the request packet,
swapping the source and destination IP addresses,
setting the second tag in the dedicated header to identify a second stage of path selection, and
clearing the third tag and clearing the congestion data.

18. A method for load balancing in a data network comprising a plurality of network switches, the method comprising:
receiving a data flow;
initiating a path selection process to determine a path between a source network switch and a destination network switch;
the path selection process selecting an optimal path based on congestion information of a first network switch and the congestion information of a second network switch, the optimal path corresponding to a path of minimal congestion;
transmitting the data flow along the selected path:
wherein the method further includes a step of selecting an aggregation switch ID being performed by a destination ToR switch, the step of selecting an aggregation switch ID comprising the steps of:

extracting the congestion information associated with the uplinks in the egress direction of a source ToR switch, and aggregating the congestion information associated with the uplinks in the egress direction with the congestion information associated with the uplinks in the ingress direction of the destination ToR switch, and selecting an aggregation switch ID that corresponds to the least congestion information.

19. The method for load balancing in a data network in accordance with claim 18, wherein the congestion information associated with the uplinks in the ingress direction is related to the aggregation switches connected to the destination ToR in the ingress direction.

20. The method for load balancing in a data network in accordance with claim 18, wherein the second stage of the two stage path selection process identifies a second hop that corresponds to a path between a source aggregation switch and a core switch, and identifies a third hop that corresponds to a path between a destination aggregation switch and the core switch, wherein the source aggregation switch and destination aggregation switch being in communication with the same core switch.

21. The method for load balancing in a data network in accordance with claim 18, wherein the method comprises the additional steps of determining the core switch that corresponds to the minimum congestion information associated with the source aggregation switch and the destination aggregation switch.

22. A method for load balancing in a data network in accordance with claim 1, wherein the method further comprises the additional steps of:

receiving a packet with a dedicated header with blank congestion data at the destination aggregation switch, adding congestion information associated with the destination aggregation switch into the congestion data field of the dedicated header, the congestion information associated with the destination aggregation switch being congestion information corresponding to the level of congestion of all uplinks in the ingress direction of the destination aggregation switch, and transmitting the packet to a source aggregation switch that corresponds to a switch ID of the destination aggregation switch.

23. A method for load balancing in a data network in accordance with claim 1, wherein the method comprises the additional steps of:

receiving a packet with the dedicated header at the source aggregation switch, comparing the congestion information associated with the destination aggregation switch with the congestion information associated with the source aggregation switch, wherein the congestion information associated with the source aggregation switch being congestion information corresponding to the level of congestion of all uplinks in the egress direction of the source aggregation switch, and identifying a core switch the corresponds to the least congestion from the congestion information associated with the destination aggregation switch and the congestion information associated with the source aggregation switch.

24. A method for load balancing in a data network in accordance with claim 1, wherein the method comprises the additional steps of:

receiving a packet with a dedicated header, by a source ToR switch, wherein the second tag of the header indicating a second stage of the two stage path selection process, and updating a path selection table based on the ID of the aggregation switch the packet was transmitted from to the source ToR switch.

25. A method for load balancing in a data network in accordance with claim 1, wherein a path selection table is utilized to record path selection decisions made by one or more network switches, the path selection table being maintained in each ToR switch, the path selection table maintaining an ID of a network switch corresponding to the selected path.

26. A method for load balancing in a data network in accordance with claim 1, wherein the data network is a three tier network comprising a core tier, an aggregation tier and a host tier, the core tier comprising a plurality of core switches, the aggregation tier comprising a plurality of aggregation switches and the host tier comprising a plurality of ToR switches, wherein each ToR switch is connected to a plurality of hosts, the aggregation switches and ToR switches being arranged in pods, the network being arranged in a Clos topology.

27. A system for load balancing in a network, the system comprising:

comprising a plurality of network switches arranged in a multi-tier network topology, each network switch comprising a processor and a memory, and wherein each of the network switches configured to perform a method for load balancing data flows within the network in accordance with claim 1.

28. A system for load balancing data flows in a network, the system comprising:

a data network, the network comprising a three tier Clos topology, the network further comprising a core tier, an aggregation tier and a host tier, the core tier comprising a plurality of core switches, the aggregation tier comprising a plurality of aggregation switches and the host tier comprising a plurality of ToR switches, wherein each ToR switch is connected to a plurality of hosts, the aggregation switches and ToR switches being arranged in pods, wherein the plurality of ToR switches, plurality of aggregation switches and plurality of core switches is configured to implement a method of load balancing in accordance with claim 1, and wherein the method of load balancing is implemented as a distributed protocol.

* * * * *